(12) United States Patent
Takahashi

(10) Patent No.: US 11,423,528 B2
(45) Date of Patent: Aug. 23, 2022

(54) IMAGE INSPECTION APPARATUS

(71) Applicant: Keyence Corporation, Osaka (JP)

(72) Inventor: Koji Takahashi, Osaka (JP)

(73) Assignee: KEYENCE CORPORATION, Osaka (JP)

(*) Notice: Subject to any disclaimer, the term of this patent is extended or adjusted under 35 U.S.C. 154(b) by 64 days.

(21) Appl. No.: 16/527,080

(22) Filed: Jul. 31, 2019

(65) Prior Publication Data

US 2020/0074618 A1 Mar. 5, 2020

(30) Foreign Application Priority Data

Aug. 31, 2018 (JP) .............................. JP2018-162781

(51) Int. Cl.
*G06K 9/32* (2006.01)
*G06T 7/00* (2017.01)
(Continued)

(52) U.S. Cl.
CPC ....... *G06T 7/0006* (2013.01); *G01N 21/8851* (2013.01); *G06T 7/12* (2017.01);
(Continued)

(58) Field of Classification Search
CPC ........... G06T 7/0006; G06T 7/73; G06T 7/13; G06T 7/174; G06T 7/80; G06T 7/12; G06T 2207/20221; G06T 7/70; G06T 2200/32; G01N 21/8851; G01N 2021/8861; G01N 21/8806
See application file for complete search history.

(56) References Cited

U.S. PATENT DOCUMENTS 8,233,665 B2   7/2012 Nakatsukasa
8,503,757 B2 *  8/2013 Naruse ................... G06T 7/001
                                                 382/152
(Continued)

FOREIGN PATENT DOCUMENTS

JP       2018-81115 A        5/2018

OTHER PUBLICATIONS

U.S. Appl. No. 16/527,078, filed Jul. 31, 2019 (85 pages).

*Primary Examiner* — Claire X Wang
*Assistant Examiner* — Han Hoang
(74) *Attorney, Agent, or Firm* — Kilyk & Bowersox, P.L.L.C.

(57) ABSTRACT

The image inspection apparatus includes a camera that images a workpiece placed on a stage and generates a workpiece image, and a second camera having an imaging field-of-view wider than that of the camera, which images the workpiece and generates a bird's eye view image. The apparatus detects a position of the workpiece based on the bird's eye view image, and positions the workpiece based on the position of the workpiece so that the workpiece is located in or near an imaging field-of-view of the camera, thereby imaging the workpiece with the camera to generate the workpiece image. The apparatus specifies a detailed position and an orientation of the workpiece in the workpiece image generated by the camera, and determines an inspection point of the workpiece in the workpiece image based on the detailed position and the orientation of the workpiece specified, thereby executing a predetermined inspection process.

20 Claims, 14 Drawing Sheets

(51) Int. Cl.
*G01N 21/88* (2006.01)
*G06T 7/73* (2017.01)
*G06T 7/13* (2017.01)
*G06T 7/174* (2017.01)
*G06T 7/80* (2017.01)
*G06T 7/12* (2017.01)

(52) U.S. Cl.
CPC .............. *G06T 7/13* (2017.01); *G06T 7/174* (2017.01); *G06T 7/73* (2017.01); *G06T 7/80* (2017.01); *G01N 2021/8861* (2013.01); *G06T 2207/20221* (2013.01)

(56) References Cited

U.S. PATENT DOCUMENTS

| | | |
|---|---|---|
| 10,088,301 B2 | 10/2018 | Naruse et al. |
| 10,088,302 B2 | 10/2018 | Takahashi et al. |
| 2012/0327215 A1* | 12/2012 | Case .................. H05K 13/0815 348/92 |
| 2013/0010081 A1* | 1/2013 | Tenney .............. G05B 19/4086 348/47 |
| 2017/0032177 A1* | 2/2017 | Suenaga ............. G06K 9/00208 |
| 2017/0032311 A1* | 2/2017 | Rizzolo ................. G06K 9/183 |
| 2017/0039715 A1* | 2/2017 | Yoshioka ................. G06T 7/75 |

* cited by examiner

IMAGE INSPECTION APPARATUS

CROSS-REFERENCE TO RELATED APPLICATIONS

The present application claims foreign priority based on Japanese Patent Application No. 2018-162781, filed Aug. 31, 2018, the contents of which is incorporated herein by reference.

BACKGROUND OF THE INVENTION

1. Field of the Invention

The present invention relates to an image inspection apparatus for imaging a workpiece and inspecting the workpiece.

2. Description of Related Art

By measuring dimensions of a predetermined portion of a product (workpiece) manufactured in a factory, an image inspection apparatus (image measurement apparatus) for inspecting whether or not the workpiece is a good product can greatly reduce the inspection burden on an inspector.

According to JP-A 2018-081115, an image measurement apparatus having a high-magnification camera and a low-magnification camera is proposed.

SUMMARY OF THE INVENTION

However, by further increasing the magnification of the camera mounted on the image measurement apparatus, it is possible to measure a smaller workpiece or a smaller measurement point in the workpiece. On the other hand, a process of searching where the workpiece is placed on an XY stage takes time. This is because when the magnification of the camera is increased, a visual field range of the camera is narrowed. Consequently, the search time required for searching for the whole XY stage increases several times, or up to several tens of times, and the usability of the image measurement apparatus decreases. It is therefore an object of the present invention to further improve the usability of the image inspection apparatus.

The present invention is to provide, for example, an image inspection apparatus including:

a stage on which a workpiece is placed;

a first camera that images the workpiece placed on the stage and generates a workpiece image;

a second camera having an imaging field-of-view wider than that of the first camera, which images the workpiece placed on the stage and generates a bird's eye view image;

a detection section that detects a position of the workpiece on the stage based on the bird's eye view image;

a driving section that moves the stage relative to the first camera in an XY direction;

a control section that controls the driving section based on the position of the workpiece detected from the bird's eye view image by the detection section so that the workpiece is located in or near the imaging field-of-view of the first camera, and allows the first camera to image the workpiece to generate the workpiece image;

a specifying section that specifies detailed position and an orientation of the workpiece in the workpiece image generated by the first camera; and an inspection section that determines an inspection point of the workpiece in the workpiece image based on the detailed position and the orientation of the workpiece specified by the specifying section, and executes a predetermined inspection process.

According to the present invention, since the joined image including the whole workpiece is generated and displayed, the usability of the image inspection apparatus is further improved.

DESCRIPTION OF EMBODIMENTS

One embodiment of the present invention will be described below. Individual embodiments described below will facilitate to understand various concepts, such as superordinate, median and subordinate concepts, of the present invention. The technical scope of the present invention is defined by the claims, and is not limited to the following specific embodiments.

<Image Measurement Apparatus 1>

Figure 1:
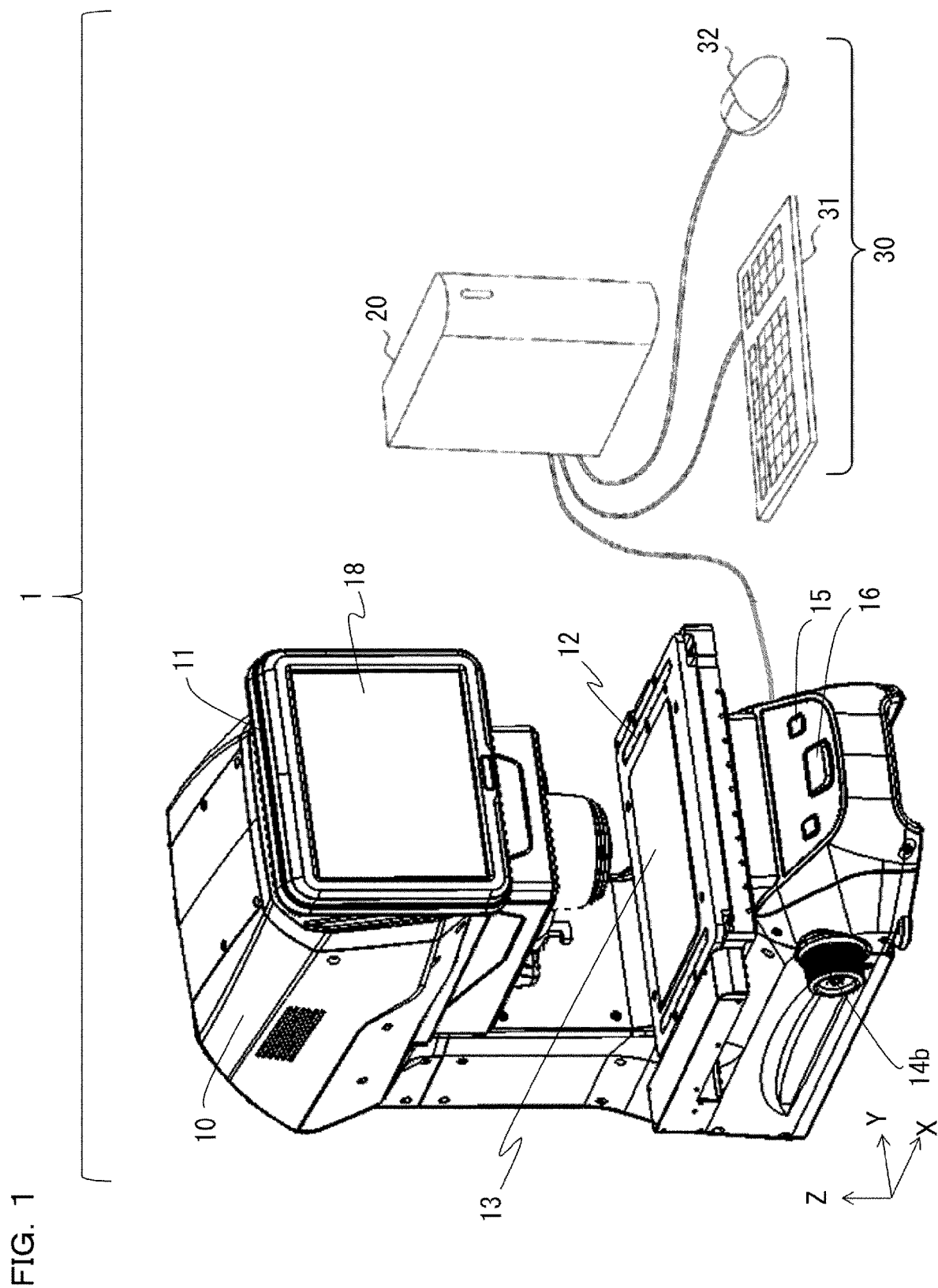
FIG. 1 is a diagram showing an outline of an image measurement apparatus.

FIG. 1 is a perspective view showing an exemplified configuration of an image measurement apparatus 1. The image measurement apparatus 1 is an apparatus for capturing an image of a workpiece to generate a workpiece image, and for measuring a dimension of the workpiece in the workpiece image. In FIG. 1, the image measurement apparatus 1 includes a measurement unit 10, a control unit 20, a keyboard 31, and a pointing device 32. The workpiece is a measuring object of which shape and dimension are measured by the image measurement apparatus 1.

The measurement unit 10 includes a display device 11, a movable stage 12, an XY-adjustment knob (not shown), a Z-adjustment knob 14b, a power switch 15, and an execution button 16. The measurement unit 10 irradiates the workpiece placed on the movable stage 12 with detection light, and receives the transmitted light of the workpiece or the reflected light from the workpiece to generate the workpiece image. The workpiece is placed in a detection area 13 of the movable stage 12. The measurement unit 10 displays the workpiece image on a display screen 18 of the display device 11.

The display device 11 is a display device for displaying the workpiece image, measurement results, and a setting UI (user interface) on the display screen 18. The user operates the keyboard 31 and the pointing device 32 while looking at the workpiece image displayed on the display device 11, thereby setting a feature position for positioning, a measurement point for measuring a dimension, and the like. The movable stage 12 is amounting table for mounting a workpiece. The detection area 13 is a region formed by a glass having translucency. The movable stage 12 moves in a Z-axis direction parallel to an imaging axis of the camera, and moves in an X-axis direction and a Y-axis direction, which are perpendicular to the imaging axis.

The XY-adjustment knob moves the movable stage 12 in the X-axis direction or in the Y-axis direction, thereby adjusting a position of the movable stage 12 relative to a camera (i.e., a position in the X-axis direction and a position in the Y-axis direction, of the movable stage 12). The Z-adjustment knob 14b moves the movable stage 12 in the Z-axis direction to adjust the position of the movable stage 12 relative to the camera (i.e., a position in the Z-axis direction). The power switch 15 is an operation section for switching a main power of the measurement unit 10 and the control unit 20 to be an on-state or an off-state. The execution button 16 is an operation section for starting dimension measurement.

The control unit 20 is a controller that controls imaging and screen displaying by the measurement unit 10, analyzes the workpiece image, and measures a dimension of the workpiece. The control unit 20 is connected to a keyboard 31 and a pointing device 32, and accepts user input through the keyboard 31 and the pointing device 32. The keyboard 31 and the pointing device 32 form an operation section 30. The control unit 20 activates the measurement unit 10 in a case where the power switch 15 is switched on. When the execution button 16 is operated, the control unit 20 controls the measurement unit 10 in accordance with setting data prepared in advance, searches for the workpiece in the detection area 13, and measures the dimension of the workpiece.

<Measurement Unit 10>

Figure 2:
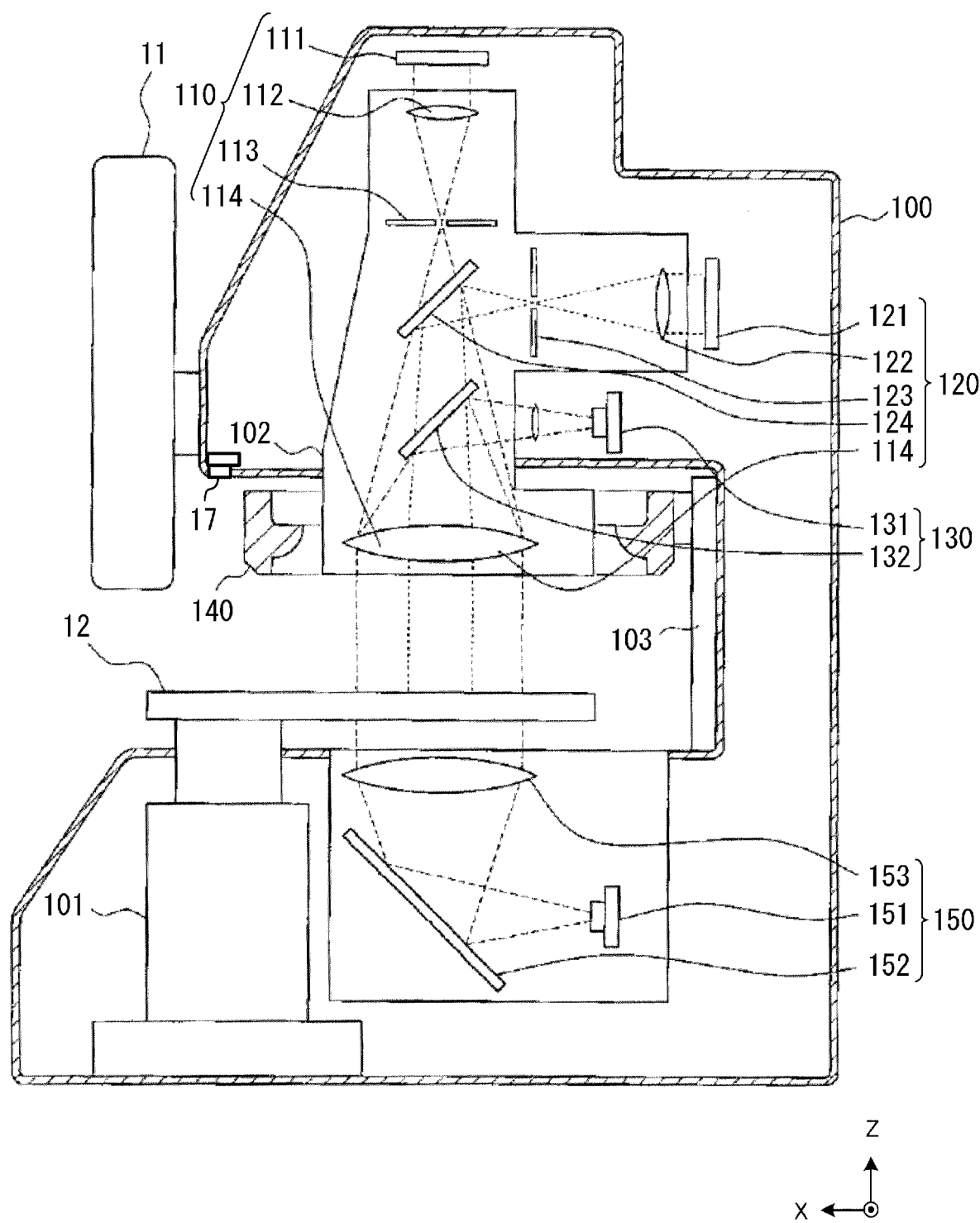
FIG. 2 is a cross-sectional view of a measurement unit.

FIG. 2 is a cross-sectional view schematically showing a configuration example of the measurement unit 10. Here, a cutting plane in a case where the measurement unit 10 is cut by a vertical plane (YZ-plane) parallel to the imaging axis is shown. The measurement unit 10 includes the display device 11, the movable stage 12, a housing 100, a stage driving section 101, a barrel section 102, an illumination position adjusting section 103, cameras 110 and 120, a coaxial epi-illumination 130, a ring illumination 140, and a transmissive illumination 150.

The stage driving section 101, the barrel section 102, the cameras 110 and 120, the coaxial epi-illumination 130, and the transmissive illumination 150 are arranged in the housing 100. The stage driving section 101 moves the movable stage 12 in the X-axis direction, the Y-axis direction, or the Z-axis direction in accordance with a driving signal from the control unit 20, and adjusts a position of the movable stage 12 with respect to the cameras 110 and 120. Since the workpiece is placed on the movable stage 12, the positional adjustment of the movable stage 12 corresponds to the positional adjustment of the workpiece.

The camera 110 is an imaging device having lower imaging magnification than the camera 120. The camera 110 includes an imaging element 111, an imaging lens 112, a diaphragm plate 113, and a light-receiving lens 114. The imaging element 111 receives the detection light and generates the workpiece image. The imaging element 111 is arranged such that a light-receiving surface faces downward. The imaging lens 112 is an optical member for imaging the detection light on the imaging element 111. The diaphragm plate 113 is an optical diaphragm that limits a transmitted light volume of the detection light, and is arranged between the imaging lens 112 and the light-receiving lens 114. The light-receiving lens 114 is an optical member that collects the detection light from the workpiece, and is arranged so as to face the movable stage 12. The imaging lens 112, the diaphragm plate 113, and the light-receiving lens 114 are arranged about a center axis extending in a vertical direction.

The camera 120 is an imaging device having higher imaging magnification than the camera 110. The camera 120 includes an imaging element 121, an imaging lens 122, a diaphragm plate 123, a half mirror 124, and the light-receiving lens 114. The imaging element 121 receives the detection light and generates the workpiece image. The imaging element 121 is arranged such that a light-receiving surface is oriented in a horizontal direction. That is, the light-receiving surface and the horizontal direction are orthogonal to each other. The imaging lens 122 is an optical member for imaging the detection light on the imaging element 121. The diaphragm plate 123 is an optical diaphragm that limits a transmitted light volume of the detection light, and is arranged between the imaging lens 122 and the half mirror 124. The light-receiving lens 114 is same as that of the camera 110. The detection light transmitted through the light-receiving lens 114 is folded in the horizontal direction by the half mirror 124, and forms an image on the imaging element 121 via the diaphragm plate 123 and the imaging lens 122.

As the imaging elements 111 and 121, for example, image sensors such as CCD (charge coupled device) and CMOS (complementary metal-oxide semiconductor) are used. As the light-receiving lens 114, a telecentric lens having a property that a size of the workpiece image is not varied even when a distance between the light-receiving lens 114 and the workpiece is varied is used. That is, the optical systems of the cameras 110 and 120 respectively have telecentricity. A distortion of the workpiece in the workpiece image acquired by a telecentric optical system is very small as compared to a distortion of the workpiece in the workpiece image acquired by a non-telecentric optical system. Therefore, the workpiece can be measured with high accuracy.

The coaxial epi-illumination 130 is an illumination device that irradiates the workpiece on the movable stage 12 with illumination light from above. An optical axis of irradiation light of the coaxial epi-illumination 130 coincides with the imaging axis. The coaxial epi-illumination 130 includes a light source 131 arranged so as to output the illumination light in the horizontal direction, and a half mirror 132 that bends downwardly the illumination light emitted from the light source 131. The illumination light of the coaxial epi-illumination 130 is advantageous when obtaining unevenness or patterns of a workpiece surface.

The imaging lenses 112 and 122, the diaphragm plates 113 and 123, the half mirrors 124 and 132, and the light-receiving lens 114 are arranged in the barrel section 102.

The transmissive illumination 150 is, an illumination device that irradiates the workpiece on the movable stage 12 with illumination light from below. The transmissive illumination 150 includes a light source 151, a mirror 152, and a condensing lens 153. The light source 151 is arranged so as to output illumination light in the horizontal direction. The illumination light emitted from the light source 151 is reflected by the mirror 152 and condensed by the condensing lens 153. The illumination light passes through the movable stage 12 and irradiates the workpiece. Part of the illumination light is blocked by the workpiece, and the other part of the illumination light enters the light-receiving lens 114. The illumination light of the transmissive illumination 150 is advantageous when acquiring an edge of a contour of the workpiece.

The ring illumination 140 is an illumination device that irradiates the workpiece on the movable stage 12 with illumination light from above or from the side. A plurality of light sources forming the ring illumination 140 are arranged to surround the imaging axes of the cameras 110 and 120. LED (light emitting diode) or a halogen lamp is used as each light source of the coaxial epi-illumination 130, the ring illumination 140, and the transmissive illumination 150. The illumination position adjusting section 103 adjusts a relative position of the ring illumination 140 with respect to the movable stage 12 by moving the ring illumination 140 in the Z-axis direction.

A bird's eye view camera 17 is an imaging device used to acquire a bird's eye view image of the movable stage 12. The bird's eye view image is an image that encompasses almost the whole movable stage 12. An imaging field-of-view of the bird's eye view camera 17 is wider than the imaging field-of-views of the cameras 110 and 120. Therefore, the bird's eye view camera 17 is suitable for acquiring a wider range of images as compared with the cameras 110 and 120. On the other hand, telecentricity of the bird's eye view camera 17 is low as compared to the telecentricity of the cameras 110 and 120. Therefore, the bird's eye view camera 17 may be referred to as a non-telecentric camera. Since a shape of the workpiece is distorted in the workpiece image acquired by the bird's eye view camera 17, the bird's eye view camera 17 is not suitable for measuring the workpiece as compared with the cameras 110 and 120. An optical system has a circular field-of-view, and a subject in the field-of-view, as an image circle, forms an image on the imaging element. On the other hand, the imaging element can image in a rectangular range. That is, an imaging region is a partial rectangular region, within the image circle. In this detailed description, the rectangular region on the movable stage 12 corresponding to the imaging region of the imaging element is called "imaging field-of-view."

<Bird's Eye View Camera>

As shown in FIG. 2, the light-receiving lens 114 and the ring illumination 140 cover quite an area of the movable stage 12. Therefore, the bird's eye view camera 17 is arranged at a position avoiding the light-receiving lens 114 and the ring illumination 140. The bird's eye view camera 17 may be implemented by a single camera, or may be implemented by a plurality of cameras.

Figure 3:
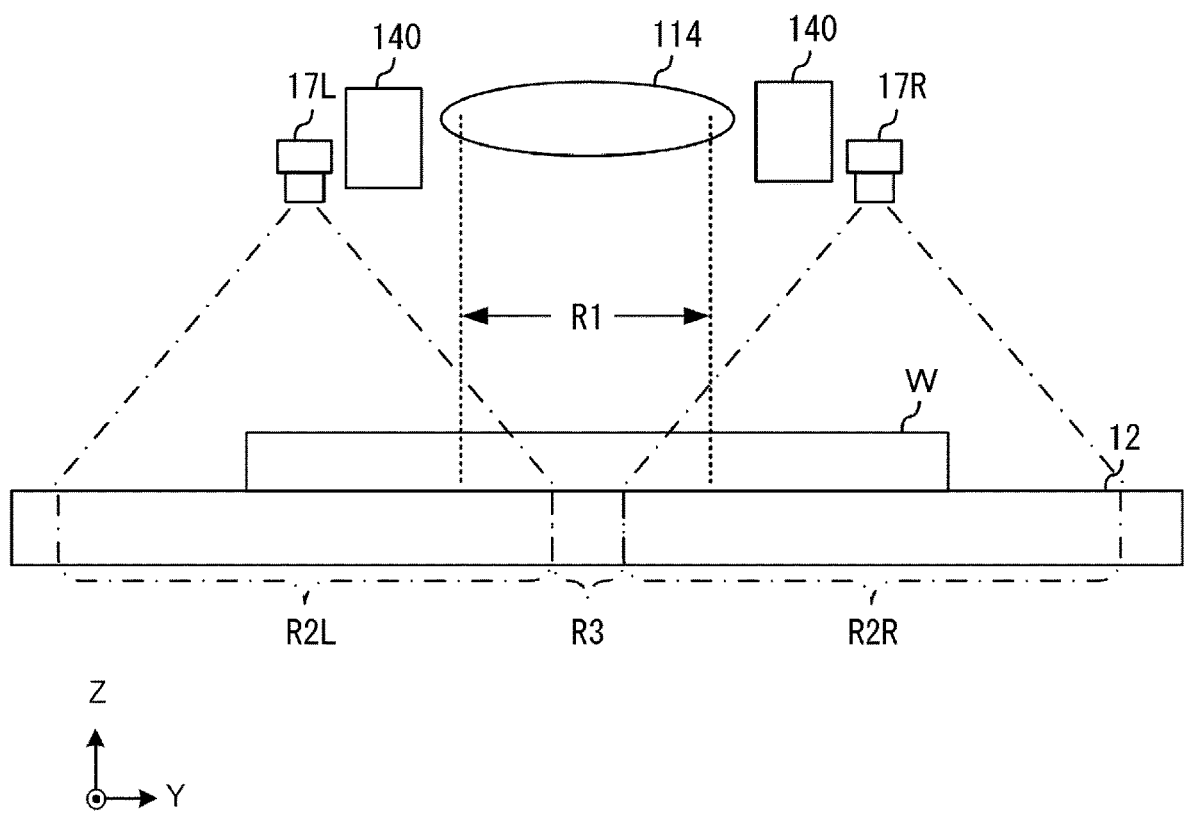
FIG. 3 is a diagram illustrating an arrangement of a bird's eye view camera.

FIG. 3 is a diagram illustrating an arrangement of the bird's eye view camera 17 when the bird's eye view camera 17 is viewed from a front side of the measurement unit 10. W indicates the workpiece. In this example, a bird's eye view camera 17L is arranged on a left side of the light-receiving lens 114, and a bird's eye view camera 17R is arranged on a right side of the light-receiving lens 114. R1 indicates a visual field range of the camera 110. R2L indicates a visual field range of the bird's eye view camera 17L. R2R indicates a visual field range of the bird's eye view camera 17R. By employing the two bird's eye view cameras 17R and 17L, it is possible to image the majority of the movable stage 12 at once. Nevertheless, other than the visual field range R2L of the bird's eye view camera 17L, a blind spot range R3 not covered by the visual field range R2L of the bird's eye view camera 17L is formed on the movable stage 12. If the light-receiving lenses of the bird's eye view cameras 17R and 17L are replaced with lenses covering a wider angle, the blind spot range R3 is not formed. However, such a wide-angle lens is expensive. By arranging the bird's eye view camera 17R and the bird's eye view camera 17L farther from the movable stage 12, the visual field ranges R2R and R2L will be widened. However, in this case, the visual field ranges R2R and R2L will be limited by the ring illumination 140. Therefore, in the present example, a method of creating a bird's eye view image covering the whole movable stage 12 is proposed.

Figure 4:
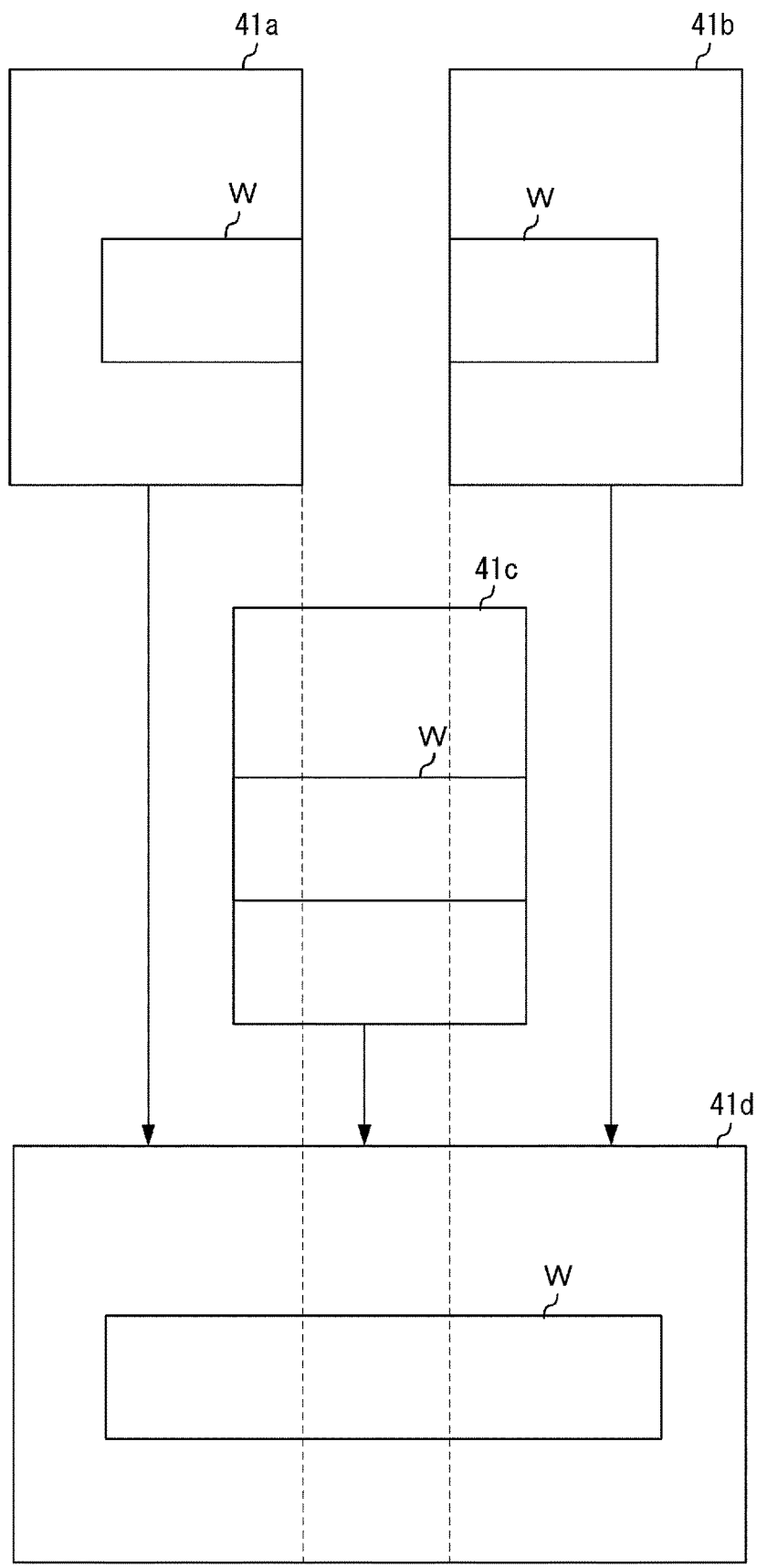
FIG. 4 is a diagram illustrating a method of generating bird's eye view images.

FIG. 4 is a diagram illustrating a method of creating a bird's eye view image. The control unit 20 moves the movable stage 12 so that a center between the imaging axis of the bird's eye view camera 17L and the imaging axis of the bird's eye view camera 17R coincide with a center of the movable stage 12, and allows the bird's eye view cameras 17L and 17R to perform the imaging. A bird's eye view image 41a is an image acquired by the bird's eye view camera 17L. A bird's eye view image 41b is an image acquired by the bird's eye view camera 17R. Since the bird's eye view camera 17R and the bird's eye view camera 17L have the blind spot range R3, a part of the workpiece W located within the blind spot range R3 does not appear in the bird's eye view images 41a and 41b.

The control unit 20 moves the movable stage 12 so that the imaging axis of the bird's eye view camera 17L (or the bird's eye view camera 17R) coincides with the center of the movable stage 12, and allows the bird's eye view camera 17L (or the bird's eye view camera 17R) to perform the imaging. Thus, a bird's eye view image 41c is generated. The bird's eye view image 41c shows a part of the workpiece W located within the blind spot range R3. The control unit 20 combines the bird's eye view images 41a and 41b with the bird's eye view image 41c to generate a bird's eye view image 41d including the whole movable stage 12. A left portion of the bird's eye view image 41c overlaps with the bird's eye view image 41a, and thus is removed. A right portion of the bird's eye view image 41c overlaps with the bird's eye view image 41b, and thus is removed.

There are various methods of generating the bird's eye view image 41d. When focusing on acquisition speed of the bird's eye view image, the number of bird's eye view images used for synthesis may be reduced. When focusing on suppressing distortion of the bird's eye view image, the number of images used for synthesis may be increased. The bird's eye view image is used for position detection, which will be described later. Therefore, when the large distortion occurs, even rough position detection may be compromised. Therefore, distortion of the bird's eye view image may be reduced.

<Automatic Workpiece Detection>

Figure 5A:
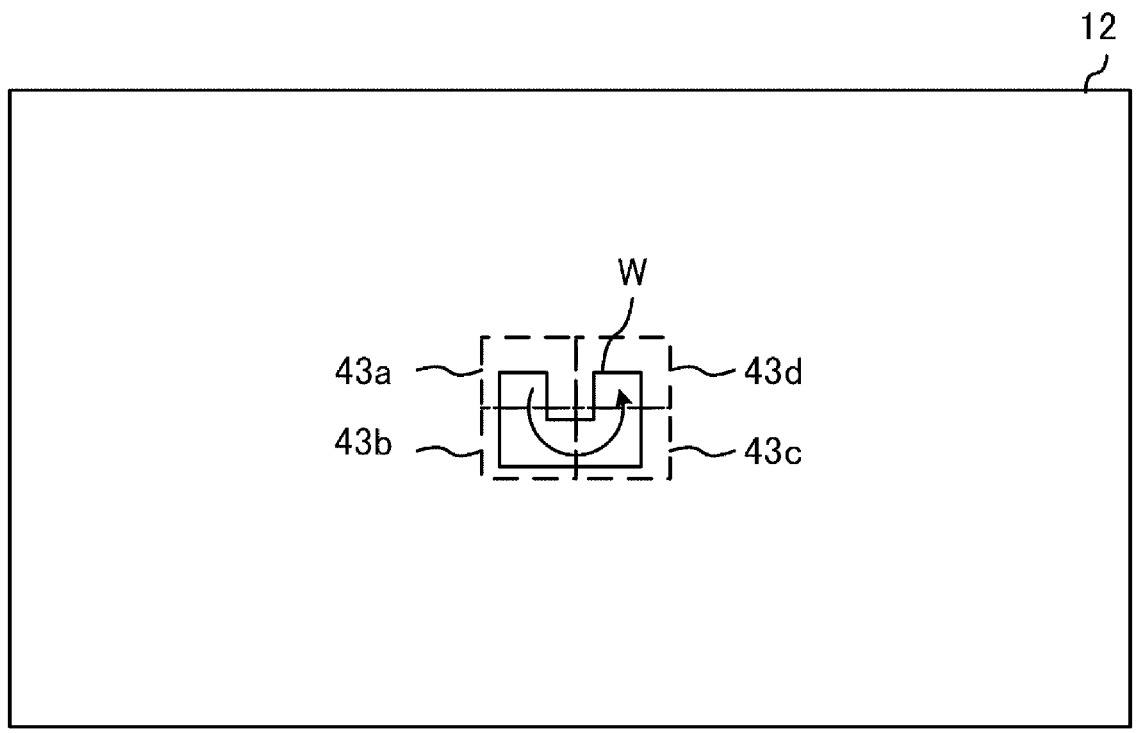
FIG. 5A is a diagram illustrating a joined image.
Figure 5B:
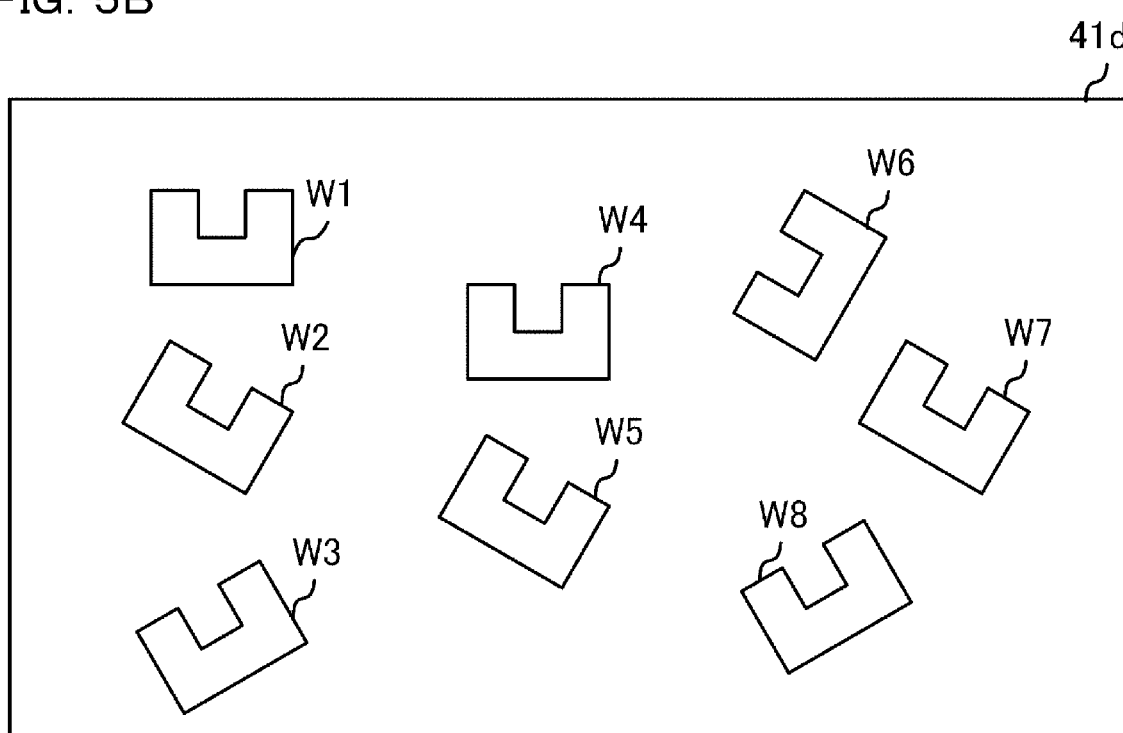
FIG. 5B is a diagram illustrating application examples of the bird's eye view images.

FIG. 5A and FIG. 5B are diagrams illustrating automatic detection of the workpiece. As shown in FIG. 5A, a single workpiece W is generally placed on the movable stage 12. In this case, since the user places the workpiece W near the center of the movable stage 12, the control unit 20 searches for the workpiece W with reference to the center of the movable stage 12. In a case where the movable stage 12 is located at a home position, an optical axis of the light-receiving lens 114 passes through the center of the movable stage 12. In this example, the control unit 20 acquires four workpiece images with the low-magnification camera 110, thereby acquiring position and orientation of the workpiece W on the movable stage 12, i.e., a rotation angle with respect to a reference model. In particular, the control unit 20 acquires a low-magnification image 43a, extracts the workpiece W existed within the low-magnification image 43a, and analyzes an extending direction of the workpiece W. In the detailed description, the extending direction of the workpiece W is referred to as a direction in which a portion has a luminance value equal to or lower than a predetermined luminance value (that is, a portion that corresponds to a so-called shadow), which is obtained by analyzing the low-magnification image 43a.

The low-magnification image 43a has an upper side, a right side, a bottom side, and a left side. Since the edge is connected to the bottom side, among these, the control unit 20 determines that the workpiece W exists in a downward direction of the low-magnification image 43a. The control unit 20 moves the movable stage 12 so as to acquire a low-magnification image 43b located in the downward direction of the low-magnification image 43a, and allows the camera 110 to perform the imaging. Thus, the low-magnification image 43b is generated. The control unit 20 analyzes the extending direction of the workpiece W in the low-magnification image 43b. Since the contour of the workpiece W is connected to a right side of the low-magnification image 43b, the control unit 20 determines that the workpiece W exists in a right direction of the low-magnification image 43b. Moreover, the contour of the workpiece W is also connected to an upper side of the low-magnification image 43b, however, the low-magnification image 43a located above the low-magnification image 43b has already been analyzed. Therefore, the low-magnification image 43a is not considered as an acquisition target. The control unit 20 moves the movable stage 12 so as to acquire a low-magnification image 43c located to the right of the low-magnification image 43b, and allows the camera 110 to perform the imaging. Thus, the low-magnification image 43c is generated. The control unit 20 analyzes the extending direction of the workpiece W in the low-magnification image 43c. Since the contour of the workpiece W is connected to an upper side of the low-magnification image 43c, the control unit 20 determines that the workpiece W exists in an upward direction of the low-magnification image 43c. The control unit 20 moves the movable stage 12 so as to acquire a low-magnification image 43d located above the low-magnification image 43c, and allows the camera 110 to perform the imaging. When the control unit 20 joins the low-magnification images 43a to 43d to generate a joined image and confirms that the contours of the workpiece W are connected to form a single contour in the joined image, the joined image is completely generated. In a setting mode, the control unit 20 accepts setting of positioning (pattern searching), setting of measurement point, and the like, with respect to the joined image. In a measurement mode, the control unit 20 detects position and orientation of the workpiece W from the joined image. The control unit 20 specifies measurement points on the workpiece W based on the position and orientation of the workpiece W, and measures the specified measurement points.

In the above paragraph, it is assumed that the workpiece W is included in the image when the control unit 20 acquires the low-magnification image 43a at first. As described in detail later, but actually, after a, first stage operation, which is a workpiece searching operation, is performed, a second stage operation for searching the whole body (contour) of the workpiece is performed as described in the above paragraph.

However, as shown in FIG. 5B, if a plurality of workpieces W (W1 to W8) can be measured only by pressing the execution button 16 once, work burden of the user is reduced. In this case, since the workpiece W also exists at a position other than the center of the movable stage 12, a process of searching for the workpiece W existed at a position other than the center is required. If the plurality of workpieces W are searched while acquiring a low-magnification image as the low-magnification image 43b, the longer search time is required. Consequently, the control unit 20 generates a bird's eye view image 41d, specifies approximate positions of the plurality of workpieces W using the bird's eye view image 41d, and acquires a low-magnification image with reference to the specified positions. It will be appreciated that the measurement time for the plurality of workpieces W is greatly shortened. It is called a multiple batch measurement mode, and the details thereof will be described later.

<Controller>

Figure 6A:
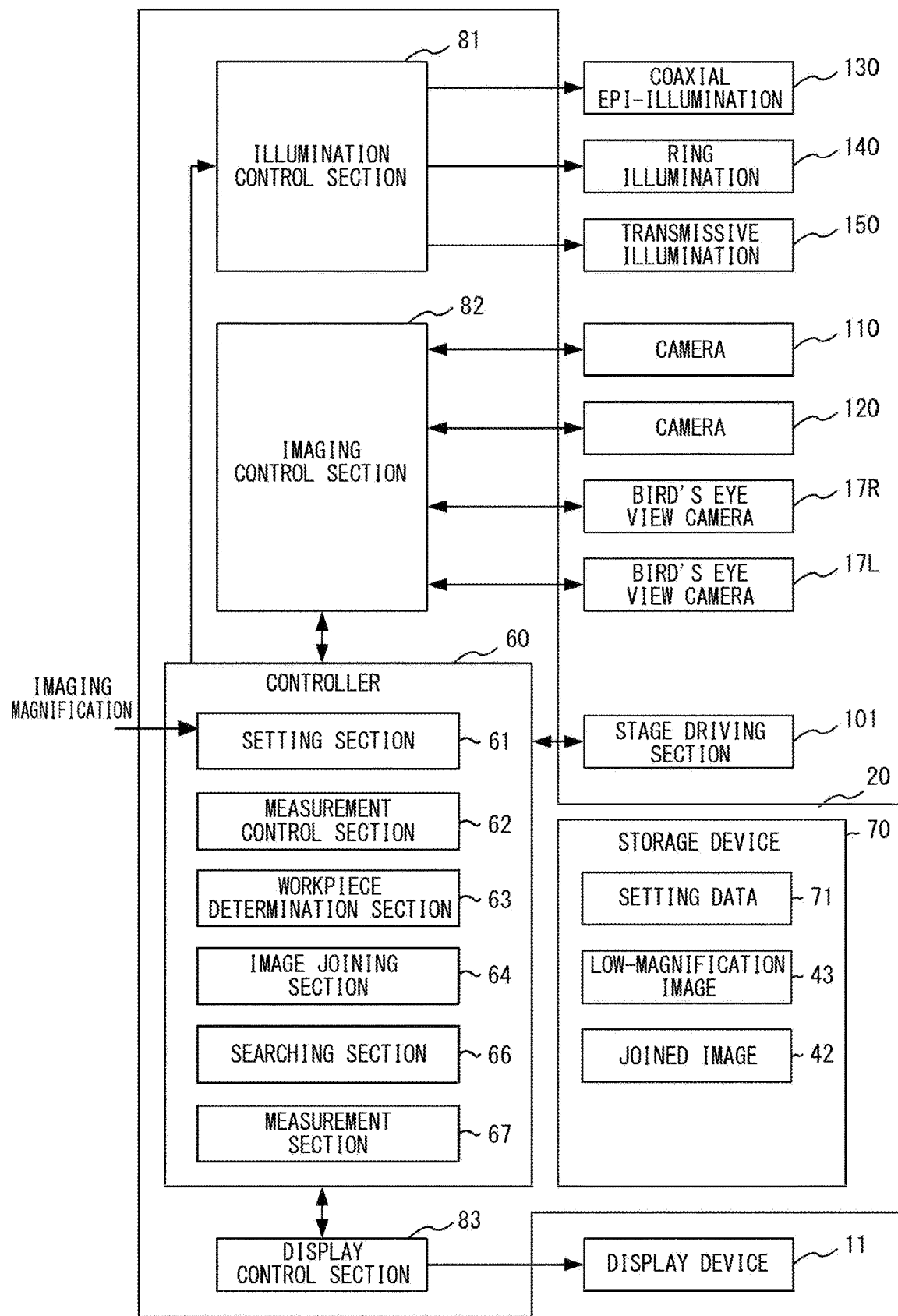
FIG. 6A is a diagram illustrating a controller.
Figure 6B:
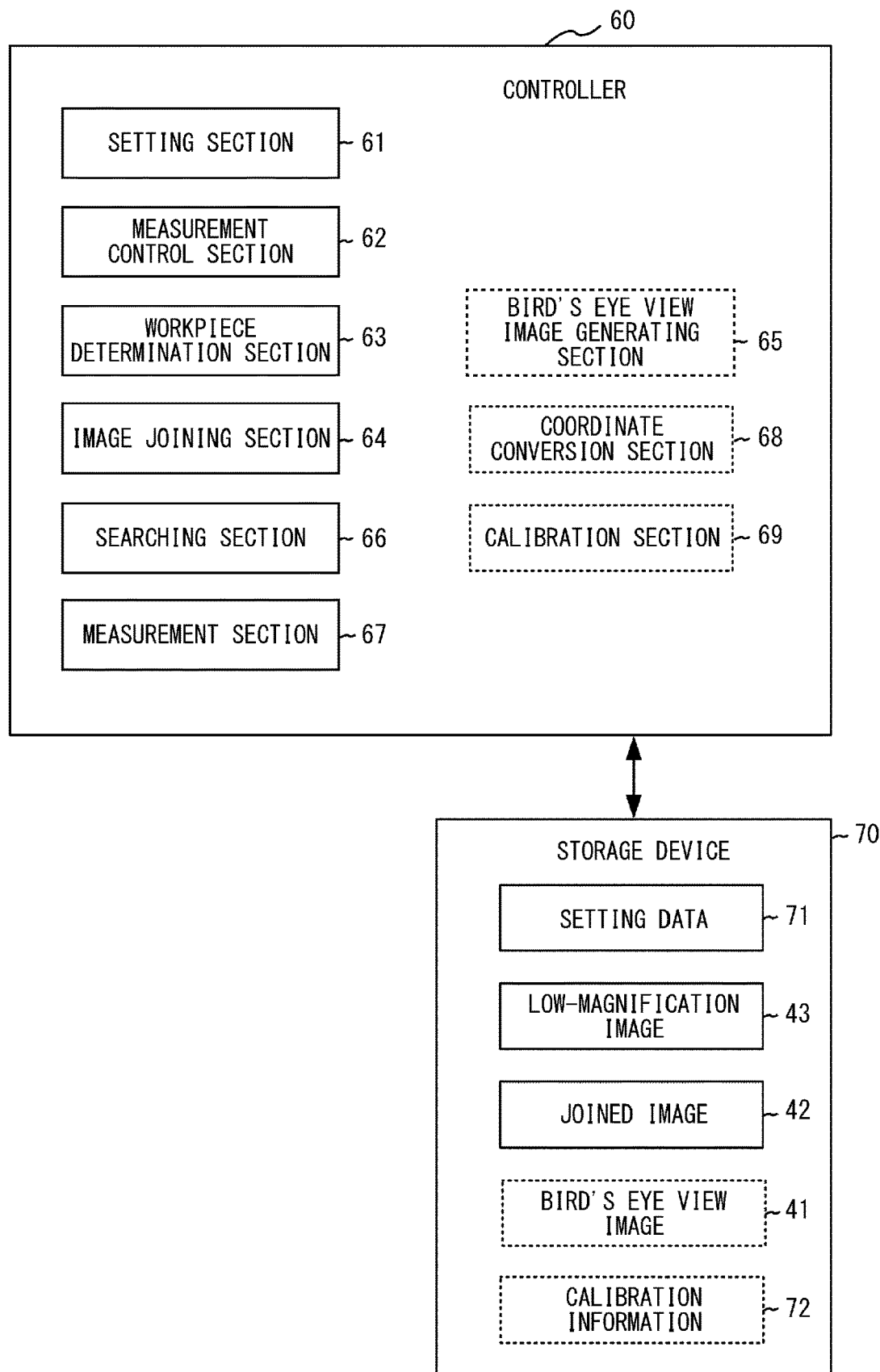
FIG. 6B is a diagram illustrating the controller.

FIG. 6A is a diagram illustrating functions of a controller 60 mounted on the control unit 20. FIG. 6B shows optional functions required for generating the bird's eye view image 41. The controller 60 consists of a CPU or the like, and controls the measurement unit 10. "CPU" is an abbreviation of "central processing unit". Some or all of the functions of the controller 60 may be implemented by hardware such as ASIC or FPGA. "ASIC" is an abbreviation of "application specific integrated circuit". "FPGA" is an abbreviation of "field programmable gate array". An illumination control section 81 is mounted on the control unit or the measurement unit 10, and controls the coaxial epi-illumination 130, the ring illumination 140, and the transmissive illumination 150 in accordance with a control signal from the controller 60. An imaging control section 82 is mounted on the control unit 20 or the measurement unit 10, and controls the cameras 110 and 120 and the bird's eye view cameras 17R and 17L, for measurement, in accordance with a control signal from the controller 60. A storage device 70 includes a memory, a hard disk drive and the like, and stores setting data 71, the low-magnification image 43, the bird's eye view image 41 and the like.

A setting section 61 generates the setting data 71 for measuring the workpiece W in accordance with a user input from the keyboard 31 or the like. The setting data 71 includes, for example, setting information related to the searching (positioning) of the workpiece W, setting information related to the measurement point, a quality threshold value, imaging conditions (imaging magnification and illumination conditions), and the like.

A measurement control section 62 turns on any one of illumination units through the illumination control section 81 and allows any one of camera units to perform the imaging through the imaging control section 82 in accordance with the setting data 71.

A workpiece determination section 63 extracts edges from images acquired by the cameras 110 and 120, and determines whether or not the edges exist. The workpiece determination section 63 obtains the extending direction of the edge, and determines coordinates of an imaging position at which the next imaging is to be performed. An image joining section 64 joins a plurality of low-magnification images 43 including the edges of the workpiece W to generate a joined image 42.

As shown in FIG. 6B, a bird's eye view image generating section 65 joins the bird's eye view images 41a to 41c acquired by the bird's eye view cameras 17R and 17L to generate the larger bird's eye view image 41d. A coordinate conversion section 68 converts the coordinates of the workpiece W within the bird's eye view image 41d into the coordinates of the camera 110. A calibration section 69 calibrates a coordinate system of the bird's eye view camera 17 using calibration information 72. The coordinate conversion section 68 and the calibration section 69 may be parts of the bird's eye view image generating section 65.

A searching section 66 specifies position and orientation of the workpiece W from the bird's eye view image 41d and the joined image 42 based on the setting data 71. For example, the searching section 66 roughly specifies a position of the workpiece W from the bird's eye view image 41d based on the setting data 71, and specifies a detailed position and an orientation of the workpiece W based on the setting data 71 from the joined image 42 acquired on the basis of the position roughly specified.

A measurement section 67 performs various measurements on the workpiece W within the workpiece image in accordance with the setting data 71. The workpiece image may be the joined image 42, or may be a high-magnification image near the measurement point, acquired by the camera 120 based on the detailed position and the orientation of the workpiece W, or may be the low-magnification image. The measurement section 67 may compare the measurement results with the quality threshold to determine whether or not the workpiece W has sufficient quality.

A display control section 83 displays a user interface (UI) for creating the setting data 71 on the display device 11 in accordance with an instruction from the controller 60, displays various images, and displays the measurement results.
<Flowchart>

Figure 7:
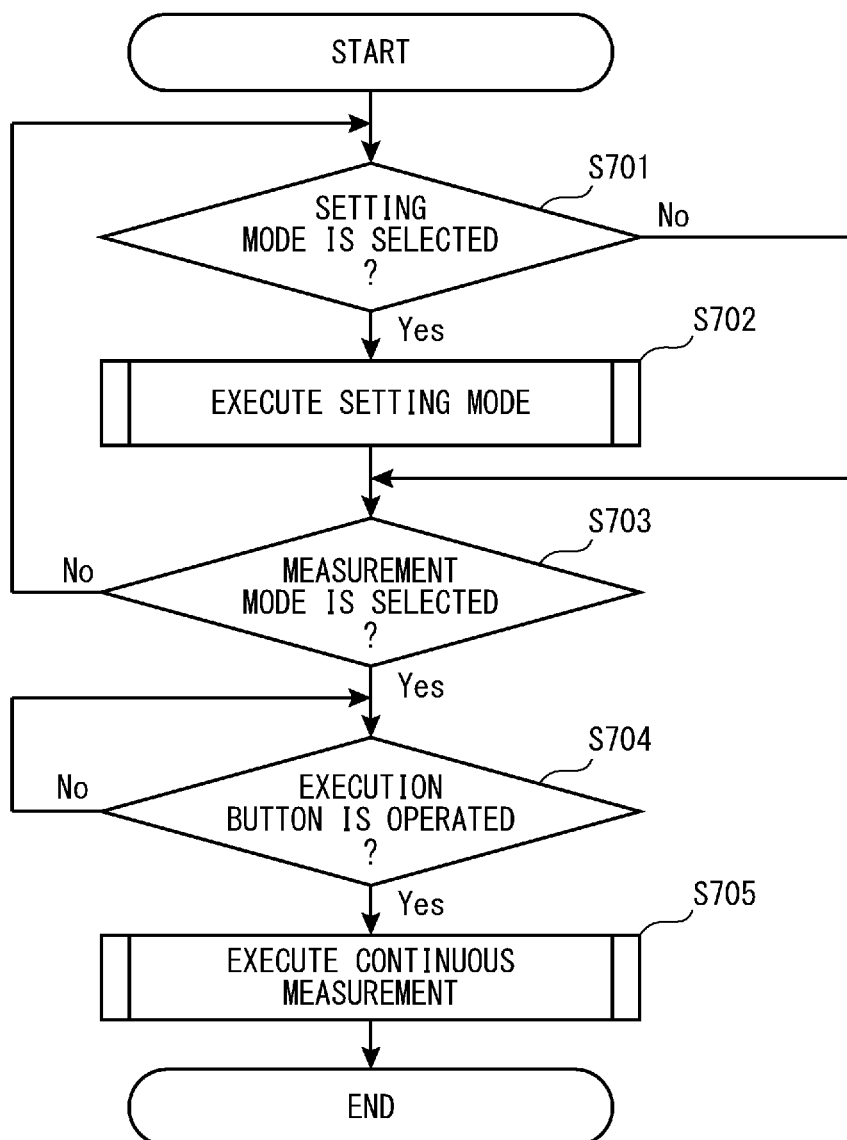
FIG. 7 is a flowchart showing a main process.

FIG. 7 is a flowchart showing a main process executed by the controller 60 when the power switch 15 is turned on.

In S701, the controller 60 determines whether or not the setting mode is selected by the user through the operation section 30. If the setting mode is not selected, the controller 60 skips S702 and proceeds to S703. On the other hand, if the setting mode is selected, the controller 60 proceeds to S702.

The controller 60 (the setting section 61) executes the setting mode in S702. The setting mode will be described later in detail with reference to FIG. 8.

In S703, the controller 60 determines whether or not the measurement mode is selected by the user through the operation section 30. The measurement mode may include a single measurement mode for measuring a single workpiece W and a multiple batch measurement mode for measuring a plurality of workpieces W. In the single measurement mode, since the workpiece W is usually arranged near the center of the movable stage 12, the measurement unit 10 starts searching for the edge of the workpiece W from the center of the movable stage 12. On the other hand, in the multiple batch measurement mode, as shown in FIG. 5B, it is likely that the plurality of workpieces W are scattered over the whole movable stage 12, so that positions of the respective workpieces are roughly specified using the bird's eye view images, and searching for the edge of the workpieces W is executed at the specified positions. For convenience of description, it is assumed that the measurement mode is a continuous measurement mode in the detailed description. If the measurement mode is not selected, the controller 60 returns to S701. On the other hand, if the measurement mode is selected, the controller 60 proceeds to S704.

In S704, the controller 60 determines whether or not execution button 16 is operated by the user. When the execution buttons 16 are operated by the user, the controller 60 proceeds to the S705.

In S705, the controller 60 (the measurement control section 62) executes the continuous measurement mode. The continuous measurement mode will be described later in detail with reference to FIG. 9.

Setting Mode

Figure 8:
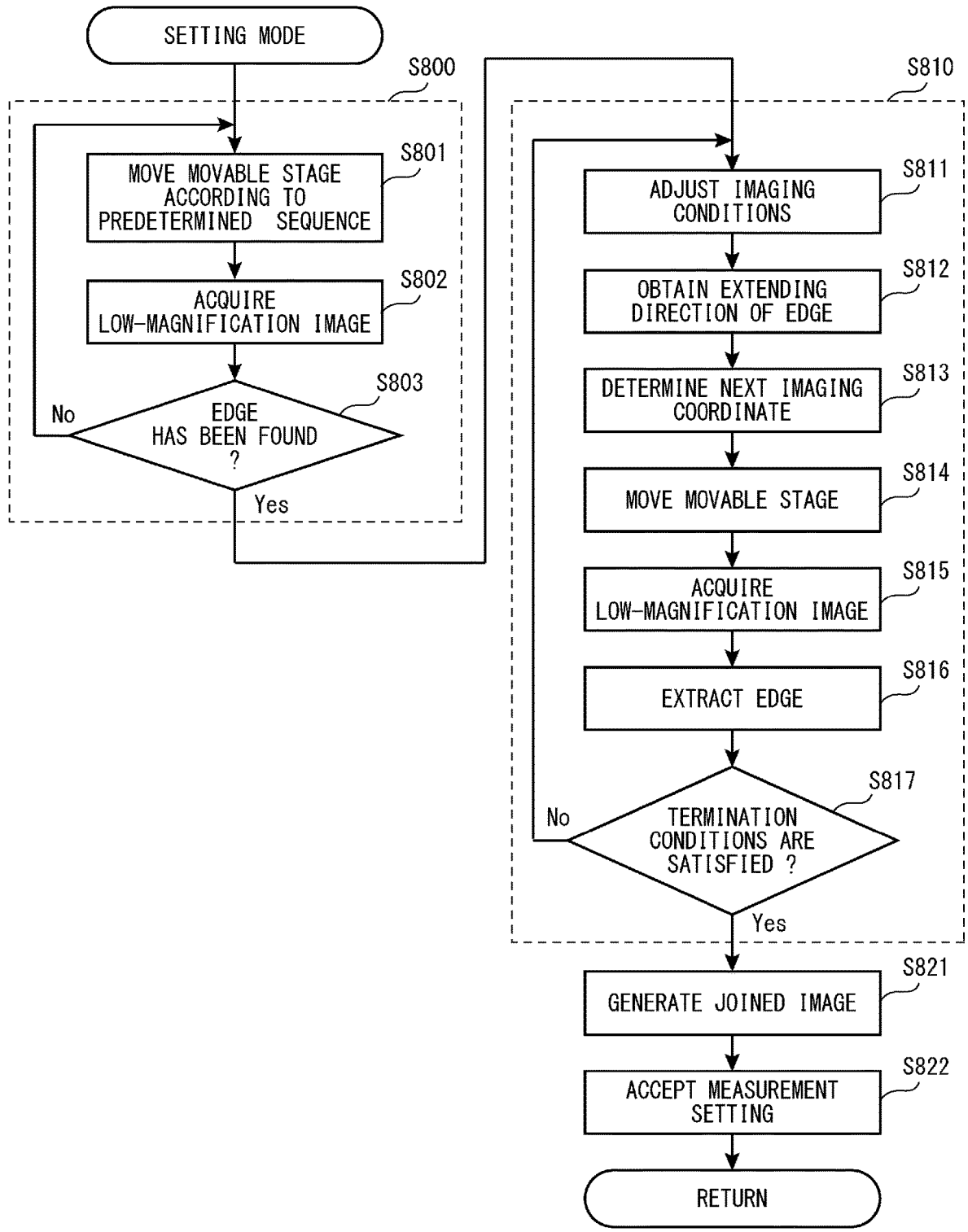
FIG. 8 is a flowchart showing a setting mode.

FIG. 8 is a flowchart showing the setting mode. S800 is the first stage operation for searching for the workpiece. S800 may include S801 to S803. S810 is a second stage operation for searching the whole body (contour) of the workpiece. S810 may include S811 to S817. As the first stage operation and the second stage operation, an example of searching with the low-magnification camera 110 will be described. However, the searching may be performed using the high-magnification camera 120, or alternatively, the searching may be performed using the low-magnification camera 110 and the high-magnification camera 120 in combination as appropriate.

In S801, the controller 60 (the measurement control section 62) moves the movable stage 12 in accordance with a predetermined sequence. In general, in the setting mode, the workpiece W with good quality (reference) is placed near the center of the movable stage 12. Therefore, the controller 60 controls the stage driving section 101 so that the imaging field-of-view of the low-magnification camera 110 is located on a grid near the center of the movable stage 12. The predetermined sequence is a sequence in which the movable stage 12 is sequentially moved to a plurality of predetermined stage coordinate positions. The predetermined sequence is defined by coordinate information of the movable stage 12, and is stored in the storage device 70. Since the image obtained by imaging within the imaging field-of-view has a rectangular shape, the whole movable stage 12 can be covered by a plurality of rectangular images. A plurality of rectangular images are arranged on the whole movable stage 12 in a shape of the grid. Therefore, the coordinates of each of the plurality of rectangular images can be managed as the coordinates of the grid. Since the grid is generally a grid point, four corners in the image correspond to the grid. A rectangle surrounded by four corners is the imaging field-of-view in a narrow sense. Therefore, each imaging field-of-view (imaging position) may be specified based on the coordinates of the upper left corner of the image. Alternatively, center coordinates of the image may be managed as the imaging position.

In S802, the controller 60 (the measurement control section 62) allows the camera 110 to perform the imaging through the imaging control section 82, and acquires the low-magnification image 43. The low-magnification image 43 is stored in the storage device 70. The low-magnification image 43 may be stored in a storage device in the measurement unit 10 and processed instead of being stored in the storage device 70 of the control unit 20.

In S803, the controller 60 (the workpiece determination section 63) determines whether or not edges exist within the low-magnification image 43. In the low-magnification image 43, the edge is a portion where the luminance value between adjacent pixels largely changes. If no edge exists within the low-magnification image 43, the controller 60 returns to S801 and moves the movable stage 12 to the next grid. If the edges are found within the low-magnification images 43, the controller 60 proceeds to S811. In other words, the controller switches the workpiece searching sequence in S800 to the contour searching sequence in S810.

In S811, the controller 60 (the measurement control section 62) adjusts operation conditions of the imaging control section 82 and operation conditions of the illumination control section 81 so that the edge of the workpiece W is emphasized. These operation conditions are referred to as the imaging conditions. The imaging conditions may include, for example, a position (in-focus position) of the movable stage 12 in the Z direction, an illumination mode (transmissive illumination/coaxial epi-illumination), exposure time, illumination light volume, and the like. Moreover, subsequent steps may be performed under predetermined conditions without adjusting the imaging conditions.

In S812, the controller 60 (the workpiece determination section 63) determines the extending direction of the edge. As described above, the extending direction may be determined based on one of the four sides with which the edge is in contact. Alternatively, a vector of the edge may be calculated.

In S813, the controller 60 (the measurement Control section 62) determines the next imaging coordinates. For example, the measurement control section 62 obtains coordinates of the adjacent grid existed in the extending direction of the edge.

In S814, the controller 60 (the measurement control section 62) sets the coordinates of the adjacent grid existed in the extending direction of the edge on the stage driving section 101 and moves the movable stage 12.

In S815, the controller 60 (the measurement control section 62) allows the camera 110 to perform the imaging through the imaging control section 82, and acquires the low-magnification image 43. The low-magnification image 43 is stored in the storage device 70.

In S816, the controller 60 (the workpiece determination section 63) extracts an edge of the workpiece from the low-magnification image 43. In this manner, the workpiece determination section 63 may serve as a determination section that determines the edge of the workpiece.

In S817, the controller 60 (the measurement control section 62) determines whether or not termination conditions are satisfied based on the extracted edges. For example, the workpiece determination section 63 determines whether or not all contour edges of the workpiece W have been extracted. Alternatively, the workpiece determination section 63 may determine the extending direction of the edge extracted from the low-magnification image 43, and determine that the termination conditions are satisfied when the grid existed in the extending direction is the grid that the low-magnification image 43 has already been acquired. If the termination conditions are not satisfied, the controller 60 returns to S811 (or alternatively, the controller may return to S812). On the other hand, if the termination conditions are satisfied, the controller 60 proceeds to S821.

In S821, the controller 60 (the image joining section 64) reads and joins the low-magnification images 43 of the workpiece W from the storage device 70 and generates the single joined image 42. The joined image 42 is also stored in the storage device 70. For example, as shown in FIG. 5A, the joined image 42 is generated from the four low-magnification images 43a to 43d.

Figure 11:
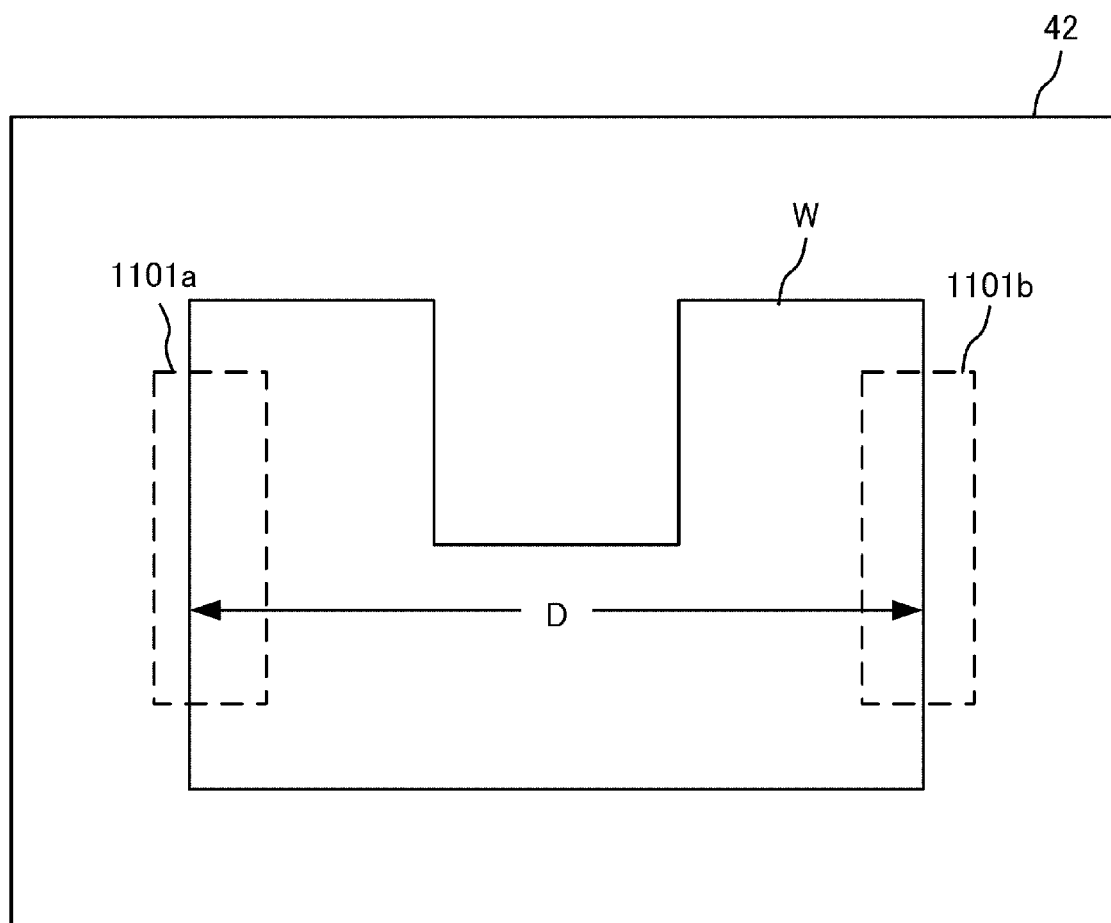
FIG. 11 is a diagram showing a method of setting a measurement point.

The controller 60 (the setting section 61) displays the joined image 42 on the display device 11 in S822, and accepts the setting of the measurement point, etc., for the workpiece W included in the joined image 42. For example, the setting section 61 accepts designation of a feature point for pattern searching, designation of two edges for measuring a certain dimension (distance), and the like. The setting section 61 may superimpose and display a rectangular or circular designated region for designating a feature point or an edge on the joined image 42 in accordance with the user input from the operation section 30. As shown in FIG. 11, two designated regions 1101a and 1101b may be designated in order to measure a length D of the workpiece W within the joined image 42. In the detailed description, the length D is defined as a distance from the edge in the designated region 1101a to the edge in the designated region 1101b. The setting section 61 may move the movable stage 12 by setting the positions of the designated regions 1101a and 1101b on the stage driving section 101, and may allow the camera 120 to acquire high-magnification images within the regions 1101a and 1101b. The setting section 61 may superimpose and display the high-magnification images on the designated regions 1101a and 1101b. In other words, the high-magnification image may be displayed in the designated region arranged on the low-magnification image. In this manner, the image of the workpiece W may be displayed in more detail in the designated regions 1101a and 1101b. The setting section 61 may accept imaging conditions (illumination conditions, magnification, focus and the like) for each of the designated regions 1101a and 1101b. That is, the imaging conditions may be different for each of the designated regions 1101a and 1101b. The setting section 61 may superimpose and display the images acquired from the designated regions 1101a and 1101b on the joined image 42. For example, the setting section 61 may superimpose and display the images acquired by resetting the shooting conditions for measurement, with the joined image 42 acquired automatically in advance as a background image. The setting section 61 creates the setting data 71 in accordance with the user input and stores the setting data 71 in the storage device 70.

Measurement Mode

Figure 9:
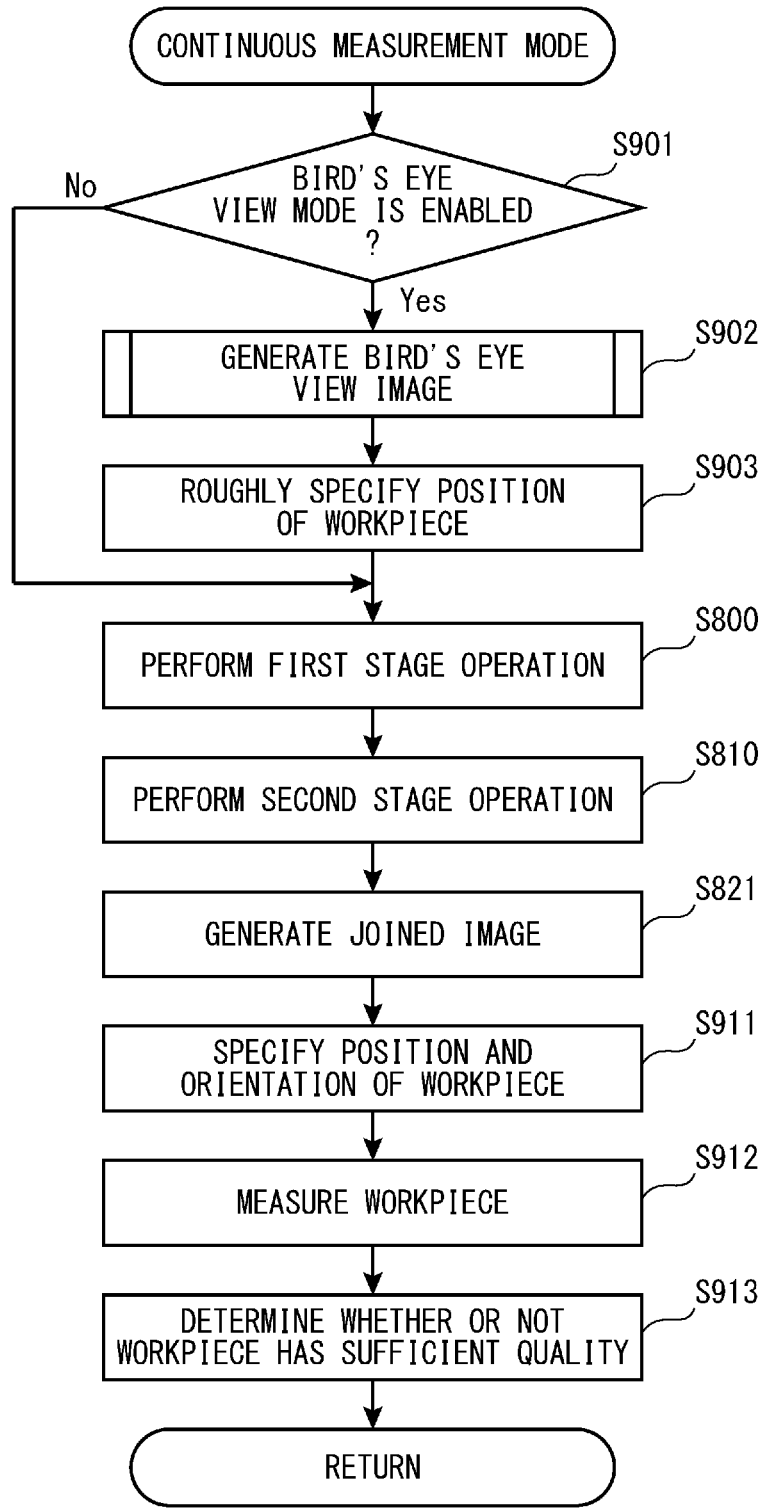
FIG. 9 is a flowchart showing a continuous measurement mode.

FIG. 9 is a flowchart showing the continuous measurement mode. Steps equivalent or similar to those already described are referred with the same reference numerals. In the detailed description, a bird's eye view mode (S901 to S903) for acquiring the bird's eye view image 41 and for roughly specifying position and orientation of the workpiece W is described; however, this step is not essential.

In S901, the controller 60 (the measurement control section 62) refers to the setting data 71 and determines whether or not the bird's eye view mode is set to be enabled. As shown in FIG. 5B, the bird's eye view mode is a mode advantageous for measuring a plurality of workpieces W. If the bird's eye view mode is enabled, the controller 60 proceeds to S902. If the bird's eye view mode is not enabled, the controller 60 skips S902 and S903 and proceeds to S800.

The controller 60 (the measurement control section 62) generates a bird's eye view image in S902. The process of generating the bird's eye view image 41 will be described in detail later with reference to FIG. 10.

In S903, the controller 60 (the measurement control section 62) uses the bird's eye view image to roughly specify a position of the workpiece W. The workpiece determination section 63 extracts the workpiece included in the bird's eye view image, and roughly obtains the position of the workpiece W. There are various methods for specifying the position of the workpiece. A method of roughly determining the position of the workpiece W as follows may be employed; in this method, a first bird's eye view image is acquired, the stage is slightly moved in the X direction or in the Y direction, a second bird's eye view image is acquired, and the position of the workpiece W is roughly determined based on a difference image between the first bird's eye view image and the second bird's eye view image. A method of roughly determining the position of the workpiece W as follows may be employed; in this method, the position of the workpiece W is roughly determined based on the difference image between the first bird's eye view image captured before placing the workpiece W and the second bird's eye view image captured after placing the workpiece W. Alternatively, a method may be employed in which the edges included in the bird's eye view image are extracted and the position of the workpiece W is roughly obtained based on the extracted edges. As shown in FIG. 5B, the workpiece determination section 63 may extract contour edges of a plurality of workpieces W and may roughly determine barycentric positions of the respective contour edges as the positions of the workpieces W. The number of workpieces W may be set in advance through the operation section 30. The workpiece determination section 63 may determine the position of each workpiece W in accordance with the number of workpieces W. For example, when four workpieces W are placed on the movable stage 12, four contour edges have to exist within the bird's eye view image 41. Therefore, the workpiece determination section 63 may extract the contour edges in accordance with the number of workpieces, and may determine the position of each contour edge. In the detailed description, the position of each workpiece W is a position within the bird's eye view image. The position of the workpiece W within the bird's eye view image exists in the coordinate system of the bird's eye view camera 17. Therefore, the workpiece determination section 63 may convert the position of the workpiece W in the coordinate system of the bird's eye view camera 17 into the position in the coordinate system of the camera 110 using the coordinate conversion section 68. Accordingly, the low-magnification image of each workpiece W can be acquired more easily.

Each process from S800 to S913 is performed for each of the plurality of workpieces W.

In S800, the controller 60 performs the first stage operation and detects the edges of the workpiece W. The first stage operation is as described above with reference to FIG. 8.

In S810, the controller 60 performs the second stage operation to generate a plurality of low-magnification images covering the workpiece W. The second stage operation is as described above with reference to FIG. 8.

In S821, the controller 60 (the image joining section 64) joins the plurality of low-magnification images to generate the joined image. The joined image may be generated by joining a plurality of high-magnification images.

In S911, the controller 60 (the searching section 66) specifies the detailed position and the orientation of the workpiece W in the joined image based on the setting data 71 for positioning.

In S912, the controller 60 (the measurement section 67) specifies the measurement point in the joined image and measures the measurement point based on the position and orientation of the workpiece W, and further based on the setting data 71 of the measurement point. A position of each measurement point is set with respect to a position of a reference feature point on the workpiece W. Therefore, the position of each measurement point in the joined image is determined by rotating the position of each measurement point in accordance with the orientation of the workpiece W with respect to the reference feature point. As described above, in order to improve the measurement accuracy, a high-magnification image of the measurement point may be acquired by the camera 120, and the measurement may be performed based on the high-magnification image.

In S913, the controller 60 (the measurement section 67) compares the measurement results of the workpiece W with predetermined quality thresholds (e.g., tolerances), and determines whether or not the workpiece W has sufficient quality. The measurement section 67 may display the measurement results on the display device 11 together with the image of the workpiece W used for the measurement.

Generation of Bird's Eye View Image

Figure 10:
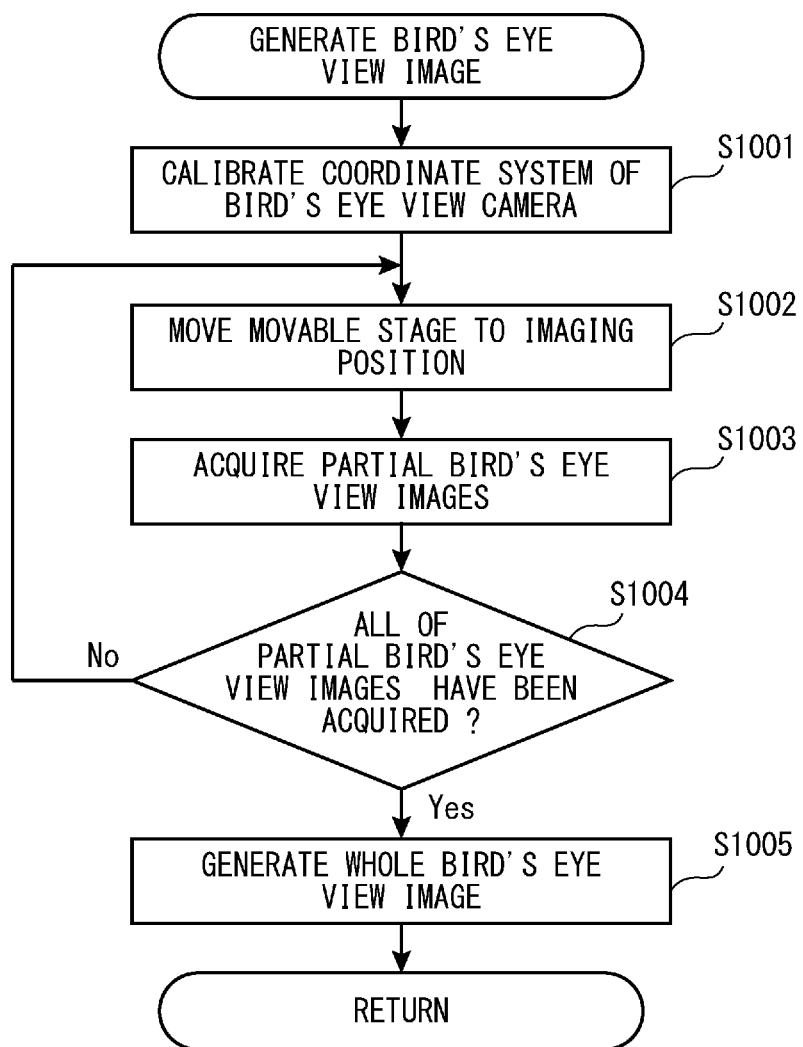
FIG. 10 is a flowchart showing a process of generating the bird's eye view images.

FIG. 10 is a flowchart showing a process of generating the bird's eye view image.

In S1001, the controller 60 (the calibration section 69) calibrates the coordinate system of the bird's eye view camera 17R and the coordinate system of the bird's eye view camera 17L based on calibration information 72 previously stored in the storage device 70. The bird's eye view camera 17R has individual differences in a mounting position and orientation with respect to the measurement unit 10. The bird's eye view camera 17L has individual differences in a mounting position and orientation with respect to the measurement unit 10. For example, an edge of the image acquired by the bird's eye view camera 17R may not be parallel to an edge of the image acquired by the camera 110. Therefore, upon assembling the measurement unit 10 in the factory, deviation amounts of the mounting position and mounting orientation are measured for each of the bird's eye view cameras 17R and 17L, and thus the calibration information 72 is created based on the measurement results and then stored in a ROM of the storage device 70. By calibrating the coordinate system of the bird's eye view camera 17R based on the calibration information 72, it is possible to accurately convert a specific position of the bird's eye view camera 17R in the coordinate system into a specific position of the camera 110 or the camera 120 in the coordinate system. Similarly, by calibrating the coordinate system of the bird's eye view camera 17L based on the calibration information 72, it is possible to accurately convert a specific position of the bird's eye view camera 17 L in the coordinate system into a specific position of the camera 110 or the camera 120 in the coordinate system.

In S1002, the controller 60 (the bird's eye view image generating section 65) sets the imaging position on the stage driving section 101, and moves the movable stage 12 to the imaging position. For example, as shown in FIG. 4, the movable stage 12 moves so as to acquire bird's eye view images 41a and 41b, which correspond to partial bird's eye view images.

In S1003, the controller 60 (the bird's eye view image generating section 65) allows the bird's eye view cameras 17R and 17L to perform the imaging through the imaging control section 82, thereby acquiring partial bird's eye view images.

In S1004, the controller 60 (the bird's eye view image generating section 65) determines whether or not all bird's eye view images 41a to 41c, required for synthesizing the bird's eye view image 41d (whole bird's eye view image), are acquired. If all of the bird's eye view images 41a to 41c have been acquired, the controller 60 proceeds to S1005. On the other hand, if all of the bird's eye view images 41a to 41c have not been acquired, the controller 60 returns to S1002. For example, when the bird's eye view images 41a and 41b are acquired but the bird's eye view image 41c is not acquired yet, the controller 60 returns to S1002. The movable stage 12 is moved to the imaging position of the bird's eye view image 41c in S1002. The bird's eye view image 41c is acquired in S1003.

In S1005, the controller 60 (the bird's eye view image generating section 65) combines a plurality of partial bird's eye view images to generate the whole bird's eye view image. In an example shown in FIG. 4, the bird's eye view image 41d is generated from the bird's eye view images 41a to 41c.

Multiple Batch Mode Using Bird's Eye View Images

As shown in the FIG. 5B, the multiple batch measurement mode will be further described, in which a plurality of workpieces W (W1 to W8) are placed on the stage and the user can measure the plurality of workpieces by pressing the execution button once.

According to the FIG. 5B, the plurality of workpieces W1 to W8 are scattered and placed over the whole movable stage 12. The controller 60 (the bird's eye view image generating section 65) allows the bird's eye view cameras 17R and 17L to perform the imaging through the imaging control section 82, and acquires the bird's eye view image. The workpiece determination section 63 roughly specifies coordinate positions (for example, center coordinates, center-of-gravity coordinates, etc.) of the respective workpieces W1 to W8 using the bird's eye view image. The workpiece determination section 63 measures the coordinate positions of the respective workpieces W1 to W8 in accordance with a predetermined rule (for example, in the order of raster scanning from the upper left to the right, in the order from the workpiece closer to the center, and the like), or in accordance with an input by the user.

In the detailed description, a case where the coordinate positions of the workpieces W1, W2, W3, . . . , W8 are measured in this order will be described. The controller 60 allows the bird's eye view cameras 17R and 17L to perform the imaging through the imaging control section 82, thereby acquiring the bird's eye view image. The controller 60 specifies the coordinate positions of the workpieces W1, W2, W3, . . . , W8. The controller stores the respective coordinate positions. Thus, the controller 60 determines a measurement order. Since the workpiece W1 is first measured, the controller 60 moves the movable stage 12 toward the coordinate position of the workpiece W1. When the movable stage 12 reaches the coordinate position of the workpiece W1, the controller 60 executes a first stage operation for searching for the workpiece W1. Thereafter, the controller 60 executes the second stage operation for searching the whole body (contour) of the workpiece W1. When the measurement of one workpiece W1 among the plurality of workpieces is completed through the second stage operation, the controller 60 shifts to the measurement of the next workpiece. The next workpiece is W2. The controller 60 moves the movable stage 12 toward the coordinate position of the workpiece W2 and performs the first stage operation for searching for the workpiece W2. Furthermore, the controller 60 measures the workpiece W2 through the second stage operation for searching for the whole body (contour) of the workpiece W2. In the same manner, the controller 60 measures the workpieces W3, W4, . . . , W8.

In this manner, it is possible to collectively execute the measurement of the workpieces W1 to W8 by using the bird's eye view cameras 17R and 17L.

After reaching the workpiece W1, the controller 60 may execute the second stage operation for searching for the whole body (contour) of the workpiece W1 without executing the first stage operation for searching for the workpiece W1. This is because the workpiece W has already been found without performing the searching operation. For example, if the workpiece W1 has already been found, the controller 60 may omit the first stage operation and perform the second stage operation.

It is described above that the workpiece determination section 63 measures the coordinate positions of the respective workpieces W1 to W8 in accordance with the predetermined rule, or alternatively, in accordance with the input by the user; however, it is a mere example. The workpiece determination section 63 may calculate a moving route each time (for example, at the coordinate position of each of the workpieces W1 to W8) to find the shortest moving distance, and then measure the coordinate position of each of the workpieces W1 to W8. For example, when the coordinate position of a certain workpiece W is measured, the workpiece determination section 63 may determine another workpiece W which is at the shortest distance from the certain workpiece W and of which the coordinate position has not yet been measured, as the next measurement target.

SUMMARY

The movable stage 12 is an example of the stage on which the workpiece W is placed. The camera 110 is an example of the imaging section that generates the image within the imaging field-of-view on the stage. The stage driving section 101 is an example of the driving section that switches the imaging field-of-view on the stage by moving the stage relative to the imaging section in the XY direction. The stage driving section 101 may move the cameras 110 and 120 with respect to the movable stage 12, or may move the movable stage 12 with respect to the cameras 110 and 120. The workpiece determination section 63 is an example of the determination section that determines whether or not the workpiece is included in the image generated by the imaging section. The controller 60 and the measurement control section 62 are examples of the control section for controlling the imaging section, the driving section, and the determination section. As described with reference to S800, when it is determined by the determination section that the workpiece W is not included in the image, the measurement control section 62 performs the first stage operation to repeat the workpiece searching process in which the imaging section generates an image in each imaging field-of-view while moving the stage by controlling the driving section in accordance with a predetermined sequence, and the determination section determines whether or not the workpiece is included in each image. As described with reference to S810, when it is determined by the determination section that the workpiece W is included in the image, the measurement control section 62 performs the second stage operation to move the stage by the driving section so that the imaging section generates images in one or more imaging field-of-views located in a direction in which the workpiece W extends, among a plurality of imaging field-of-views located around the imaging field-of-view on the stage, in which the image has been obtained. When the image including the workpiece W is found in the first stage operation, the measurement control section 62 switches from the first stage operation to the second stage operation. The image joining section 64 is an example of the image joining section that joins the plurality of images generated in the second stage operation to generate the joined image including the whole workpiece W. Thus, the present invention is particularly useful in a case where the imaging magnification of the cameras 110 and 120 is higher and the workpiece W is not accommodated in the imaging field-of-views of the cameras 110 and 120. According to the present invention, the workpiece W is detected from the image acquired by the camera 110, and the joined image 42 including the whole workpiece W is generated based on the workpiece W. Therefore, the usability of the image measurement apparatus 1 is further improved.

The measurement control section 62 may adjust the imaging conditions of the imaging section based on the image when the image including the workpiece W is found in the first stage operation, and may use the adjusted imaging conditions in the second stage operation. Consequently, the workpiece W is extracted more easily, and thus the image covering the whole workpiece W is generated more easily.

When it is determined by the determination section that at least a part of the workpiece is not included in the imaging field-of-view, the measurement control section 62 may continue to generate the joined image according to the predetermined sequence in accordance with the imaging conditions of the imaging section. For example, the default imaging conditions may be continuously used until the workpiece W is initially found in the first stage operation. The imaging conditions may include at least one of in-focus position, optical magnification, diaphragm conditions, illumination conditions, and exposure time of the optical system of the imaging section. The in-focus position with respect to the workpiece W may be changed by, for example, moving the movable stage 12 in the Z direction with respect to the cameras 110 and 120.

The measurement control section 62 may have the setting mode for setting the measurement point of the workpiece W and the measurement mode for performing measurement on the measurement point set by the setting mode. The image joining section 64 may generate the joined image 42 in the setting mode. Consequently, the user will easily set the various settings while checking the whole workpiece W using the joined image 42.

The transmissive illumination 150 is an example of the transmissive illumination that irradiates the workpiece W with light from below the stage having translucency. The coaxial epi-illumination 130 is an example of the epi-illumination that irradiates the workpiece with light from above the stage. The image joining section 64 may generate the joined image 42 by joining images of the workpiece W irradiated with light by the epi-illumination. The epi-illumination helps the user to visually observe patterns on the surface of the workpiece W. The workpiece determination section 63 may determine whether or not the workpiece W is included in the image of the workpiece W irradiated with light by the transmissive illumination. The transmissive illumination helps to highlight the edges of the workpiece W.

The display device 11 is an example of the display section that displays the joined image 42 in the setting mode. The operation section 30 may serve as the acceptation section that accepts designation of the extraction region of the edge serving as the measurement point and the imaging conditions of the image with respect to the workpiece W included in the joined image 42 displayed on the display section. Since the imaging conditions of the camera 110 and the imaging conditions of the camera 120 are different from each other, the imaging conditions of any one of the camera 110 and the camera 120 may be designated. The setting section 61 may serve as the setting section sets the number of images required for extracting the edge serving as the measurement point based on the imaging conditions accepted by the acceptation section.

In the measurement mode, the searching section 66 may specify the stage coordinates of the measurement point set in the setting mode by performing the pattern searching on the joined image 42. The measurement control section 62 may allow the imaging section to image the measurement point again using the imaging conditions set at the measurement point in the setting mode with the stage coordinates specified by the searching section 66. The measurement section 67 and the workpiece determination section 63 may extract the edge of the measurement point using the image generated by imaging again.

The workpiece determination section 63 may determine the boundary portion of the workpiece W as the edge based on the luminance value in the image. That is, the contour of the workpiece W may be extracted as the edge.

The storage device 70 is an example of a storage section that stores information relating to the stage coordinates of each imaging field-of-view in the stage. The measurement control section 62 may determine the moving direction of the stage in the second stage operation based on stage coordinates of the imaging field-of-view of the image including at least a part of the workpiece W found in the first stage operation, and information relating to the direction in which the workpiece W extends, and information relating to the stage coordinates (for example, the grid coordinates) of each imaging field-of-view stored in the storage section.

The measurement control section 62 may allow the image joining section to generate the joined image while the imaging section generates the image and the driving section moves the stage in the second stage operation. The measurement control section 62 may allow the image joining section to generate the joined image after a plurality of images are completely generated by the imaging section in the second stage operation.

The measurement cameras 110 and 120 are examples of a first camera that images the workpiece placed on the stage and generates the workpiece image. The bird's eye view camera 17 is an example of a second camera having the imaging field-of-view wider than that of the first camera, which images the workpiece placed on the stage and generates the bird's eye view image. The workpiece determination section 63 is an example of a detection section that detects the position of the workpiece W on the stage based on the bird's eye view image. The stage driving section 101 is an example of a driving section that moves the stage relative to the first camera in an XY direction. The measurement control section 62 controls the driving section based on the position of the workpiece W detected from the bird's eye view image by the detection section so that the workpiece is located in or near the imaging field-of-view of the first camera, and allows the first camera to image the workpiece to generate the workpiece image. Moreover, the workpiece W located in or near the imaging field-of-view of the first camera means that the whole or at least a part of the workpiece W is accommodated in the imaging field-of-view. Furthermore, the workpiece W may be not located in the imaging field-of-view, but located close to the imaging field-of-view. The searching section 66 is an example of a specifying section that specifies the detailed position and the orientation of the workpiece in the workpiece image generated by the first camera. The measurement section 67 is an example of an inspection section that determines an inspection point of the workpiece W in the workpiece image based on the detailed position and the orientation of the workpiece W specified by the specifying section, and executes a predetermined inspection process. The designated regions 1101a and 1101b of the measurement points are examples of the inspection points. Since the position of the workpiece W is obtained using the bird's eye view image in this manner, the position of the workpiece W is determined in a shorter time. For example, even if the workpiece W is not placed at the center of the movable stage 12, the position of the workpiece W can be determined in a short time. Moreover, if the plurality of workpieces W are mounted on the movable stage 12, the position of each workpiece W can be determined in a short time.

The coordinate conversion section 68 is an example of a coordinate conversion section that converts the coordinates in the coordinate system of the second camera into the coordinates in the coordinate system of the first camera. The coordinate conversion section 68 may convert the coordinates of the position of the workpiece detected from the bird's eye view image by the detection section into the coordinates in the coordinate system of the first camera. The measurement control section 62 may control the driving section based on the position of the workpiece in the coordinate system of the first camera acquired by the coordinate conversion section 68.

As shown in FIG. 3, when viewed from a stage side, the second camera may include one or more bird's eye view cameras, and may be provided in a peripheral portion of the first camera. The second camera may include a first bird's eye view camera and a second bird's eye view camera. The first camera may be provided between the first bird's eye view camera and the second bird's eye view camera when viewed from the stage side. Furthermore, the imaging field-of-view of the first bird's eye view camera and the imaging field-of-view of the second bird's eye view camera may be different. The storage device 70 may function as a storage section that stores information relating to the mounting position and the mounting orientation of the first bird's eye view camera with respect to the image inspection apparatus, and information relating to the mounting position and the mounting orientation of the second bird's eye view camera with respect to the image inspection apparatus. Such information may be stored in the storage device 70 as the calibration information 72. The calibration section 69 is an example of a calibration section that calibrates the coordinate system of the first bird's eye view camera on the basis of the information relating to the mounting position and the mounting orientation of the first bird's eye view camera, and calibrates the coordinate system of the second bird's eye view camera on the basis of the information relating to the mounting position and the mounting orientation of the second bird's eye view camera.

The bird's eye view image generating section 65 is an example of a generating section that generates the bird's eye view image including the whole stage by joining the image acquired by the first bird's eye view camera and the image acquired by the second bird's eye view camera.

The measurement control section 62 controls the driving section so that the bird's eye view image including the whole stage is generated by joining the image acquired by the first bird's eye view camera and the image acquired by the second bird's eye view camera. Thus, the stage moves relatively to the first bird's eye view camera and the second bird's eye view camera.

The telecentricity of the second camera may be lower than that of the first camera. That is, the second camera may be advantageous for creating the bird's eye view image. The first camera may be advantageous for measuring the workpiece W.

A method of creating the bird's eye view image using two bird's eye view cameras has been described with reference to FIG. 3. However, it is also possible to create the bird's eye view image using a single bird's eye view camera. In this case, the wide-angle lens is employed as the optical system used in the bird's eye view camera.

In the method of creating the bird's eye view image described with reference to FIG. 4, the movable stage 12 moves so that the center between the imaging axis of the bird's eye view camera 17L and the imaging axis of the bird's eye view camera 17R coincide with the center of the movable stage 12, and the bird's eye view cameras 17L and 17R perform the imaging. The method of creating the bird's eye view image is not limited to this.

Figure 12A:
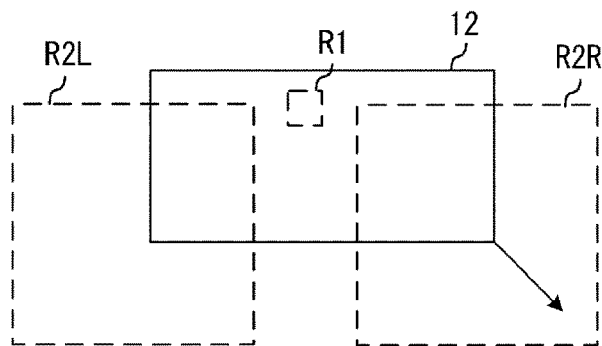
FIGS. 12A-D is a diagram illustrating a method of generating the bird's eye view images.

As shown in FIG. 12A, the controller 60 moves the movable stage 12.

Figure 12B:
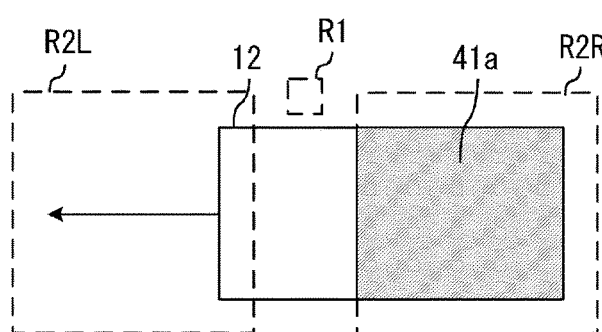

As shown in FIG. 12B, the controller 60 allows a bird's eye view camera 12R to perform the imaging, thereby acquiring the partial bird's eye view image 41a.

Figure 12C:
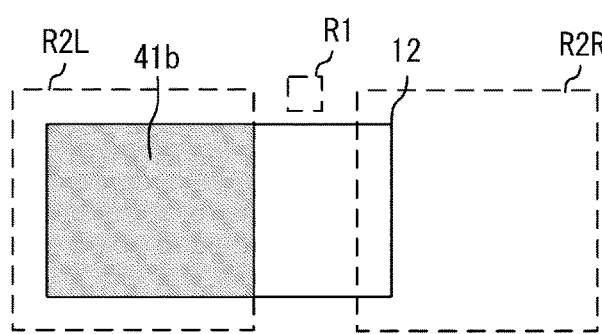

As shown in FIG. 12C, the controller 60 moves the movable stage 12 in a left direction and allows a bird's eye view camera 12L to perform the imaging, thereby acquiring the partial bird's eye view image 41b.

Figure 12D:
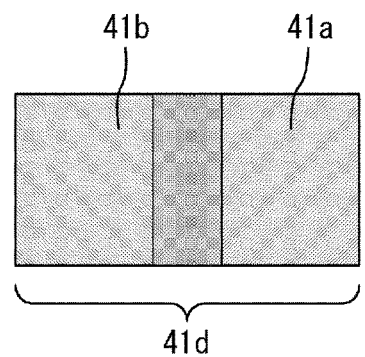

As shown in FIG. 12D, the controller 60 combines the bird's eye view image 41a and the bird's eye view image 41b to generate the bird's eye view image 41d showing the whole movable stage 12.

As described above, since the optical systems of the bird's eye view cameras 17L and 17R employ the wide-angle lenses, the large distortion occurs in the peripheral portion of the imaging field-of-view as compared with the central portion of the imaging field-of-view. Therefore, the bird's eye view may be generated only from the vicinity of the center of the imaging field-of-views of the bird's eye view cameras 17L and 17R.

Figure 13A:
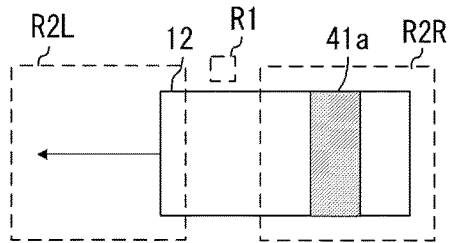
FIGS. 13A-F is a diagram illustrating a method of generating the bird's eye view images.

As shown in FIG. 13A, the controller 60 moves the movable stage 12 and allows the bird's eye view camera 12R to perform the imaging, thereby acquiring the partial bird's eye view image 41a.

Figure 13B:
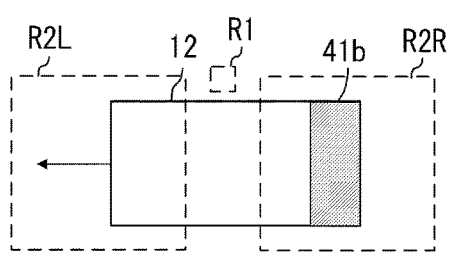

As shown in FIG. 13B, the controller 60 moves the movable stage 12 in the left direction and allows the bird's eye view camera 12R to perform the imaging, thereby acquiring the partial bird's eye view image 41b.

Figure 13C:
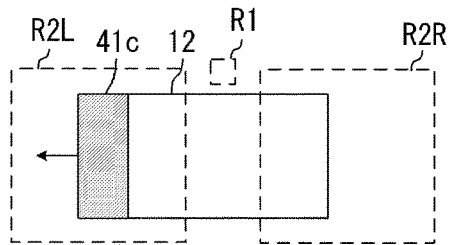

As shown in FIG. 13C, the controller 60 moves the movable stage 12 in the left direction and allows the bird's eye view camera 12L to perform the imaging, thereby acquiring the partial bird's eye view image 41c.

Figure 13D:
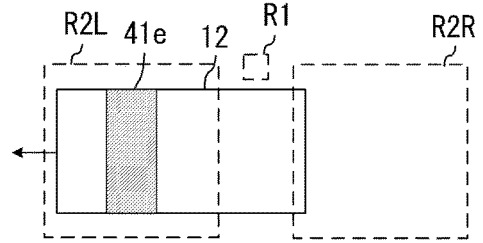

As shown in FIG. 13D, the controller 60 moves the movable stage 12 in the left direction and allows the bird's eye view camera 12L to perform the imaging, thereby acquiring the partial bird's eye view image 41e.

Figure 13E:
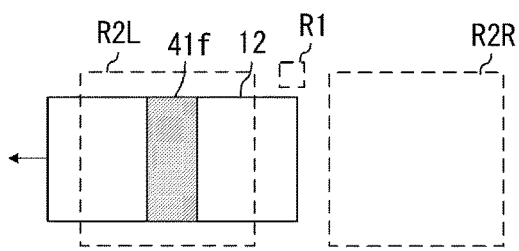

As shown in FIG. 13E, the controller 60 moves the movable stage 12 in the left direction and allows the bird's eye view camera 12L to perform the imaging, thereby acquiring the partial bird's eye view image 41f.

Figure 13F:
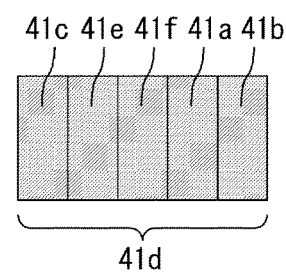

As shown in FIG. 13F, the controller 60 combines the bird's eye view images 41a, 41b, 41c, 41d, 41e, and 41f to generate a bird's eye view image 41d showing the whole movable stage 12.

What is claimed is:

1. An image inspection apparatus comprising:

a stage on which a workpiece is placed;

a first camera having a telecentric optical system that is utilized for image inspection of the workpiece, and includes a low-magnification camera and a high-magnification camera and images the workpiece placed on the stage and generates a workpiece image;

a second camera having a non-telecentric optical system and an imaging field-of-view wider than that of the low-magnification camera and the high-magnification camera in the first camera, which images the workpiece placed on the stage and generates a bird's eye view image via an optical system different from that of the low-magnification camera and the high-magnification camera in the first camera;

a detection section that detects a rough position of the workpiece on the stage based on the bird's eye view image;

a driving section that moves the stage relative to the first camera in an XY direction;

a control section that controls the driving section based on the rough position of the workpiece detected from the bird's eye view image by the detection section so that the workpiece is located in or near the imaging field-of-view of the first camera, and allows the first camera to image the workpiece to generate the workpiece image;

a specifying section that, after the rough position of the workpiece being detected by the detection section, specifies a detailed position and an orientation of the workpiece, which is more detailed than the rough position detected by the detection section, in the workpiece image generated by the low-magnification camera of the first camera;

an inspection section that determines an inspection point of the workpiece in the workpiece image based on the detailed position and the orientation of the workpiece specified by the specifying section, and executes a predetermined inspection process by using the high-magnification camera; and a coordinate conversion section that converts coordinates in a coordinate system of the second camera into coordinates in a coordinate system of the low-magnification camera and the high-magnification camera in the first camera, wherein the coordinate conversion section converts coordinates of a position of the workpiece detected from the bird's eye view image by the detection section into coordinates in the coordinate system of the low-magnification camera and the high-magnification camera in the first camera, and the control section controls the driving section based on the position of the workpiece in the coordinate system of the first camera acquired by the coordinate conversion section.

2. The image inspection apparatus according to claim 1, wherein the second camera has a first bird's eye view camera and a second bird's eye view camera, and the first camera is provided between the first bird's eye view camera and the second bird's eye view camera when viewed from a stage side.

3. The image inspection apparatus according to claim 2, wherein the imaging field-of-view of the first bird's eye view camera and the imaging field-of-view of the second bird's eye view camera are different from each other.

4. The image inspection apparatus according to claim 2, further comprising:

a storage section that stores information relating to a mounting position and a mounting orientation of the first bird's eye view camera with respect to the image inspection apparatus, and information relating to a mounting position and a mounting orientation of the second bird's eye view camera with respect to the image inspection apparatus; and a calibration section that calibrates a coordinate system of the first bird's eye view camera on the basis of the information relating to the mounting position and the mounting orientation of the first bird's eye view camera, and calibrates a coordinate system of the second bird's eye view camera on the basis of the information relating to the mounting position and the mounting orientation of the second bird's eye view camera.

5. The image inspection apparatus according to claim 2, further comprising:

a generating section that generates the bird's eye view image including the whole stage by joining an image acquired by the first bird's eye view camera and an image acquired by the second bird's eye view camera.

6. The image inspection apparatus according to claim 5, wherein the control section controls the driving section so that the bird's eye view image including the whole stage is generated by joining the image acquired by the first bird's eye view camera and the image acquired by the second bird's eye view camera, in order to move the stage relative to the first bird's eye view camera and the second bird's eye view camera.

7. The image inspection apparatus according to claim 1, wherein telecentricity of the second camera is lower than that of the first camera.

8. The image inspection apparatus according to claim 2, wherein the second camera includes one or more bird's eye view cameras and is provided at a peripheral portion of the first camera when viewed from a stage side.

9. A control method of an image inspection apparatus, which includes a stage on which a workpiece is placed, a first camera having a telecentric optical system that is utilized for image inspection of the workpiece, and includes a low-magnification camera and a high-magnification camera and images the workpiece placed on the stage and generates a workpiece image, and a second camera having a non-telecentric optical system and an imaging field-of-view wider than that of the low-magnification camera and the high-magnification camera in the first camera, which images the workpiece placed on the stage and generates a bird's eye view image via an optical system different from that of the low-magnification camera and the high-magnification camera in the first camera, the method comprising:

generating the bird's eye view image by imaging the stage from above with the second camera;

detecting a rough position of the workpiece on the stage based on the bird's eye view image;

moving the stage relative to the first camera based on the rough position of the workpiece detected from the bird's eye view image so that the workpiece is located in or near an imaging field-of-view of the first camera, and imaging the workpiece with the first camera, in order to generate the workpiece image;

after the rough position of the workpiece being detected by the detection section, specifying a detailed position and an orientation of the workpiece, which is more detailed than the position detected by the detection section, in the workpiece image generated by low-magnification camera of the first camera;

determining an inspection point of the workpiece in the workpiece image based on the detailed position and the orientation of the workpiece specified, and executing a predetermined inspection process by using the high-magnification camera, converting coordinates in a coordinate system of the second camera into coordinates in a coordinate system of the low-magnification camera and the high-magnification camera in the first camera, converting coordinates of a position of the workpiece detected from the bird's eye view image into coordinates in the coordinate system of the low-magnification camera and the high-magnification camera in the first camera, and moving the stage based on the position of the workpiece in the coordinate system of the first camera acquired by the coordinate conversion.

10. The control method according to claim 9, wherein the second camera has a first bird's eye view camera and a second bird's eye view camera, and the first camera is provided between the first bird's eye view camera and the second bird's eye view camera when viewed from a stage side.

11. The control method according to claim 10, wherein the imaging field-of-view of the first bird's eye view camera and the imaging field-of-view of the second bird's eye view camera are different from each other.

12. The control method according to claim 10, further comprising:

generating the bird's eye view image including the whole stage by joining an image acquired by the first bird's eye view camera and an image acquired by the second bird's eye view camera.

13. The control method according to claim 12, wherein the stage relative to the first camera is controlled so that the bird's eye view image including the whole stage is generated by joining the image acquired by the first bird's eye view camera and the image acquired by the second bird's eye view camera, in order to move the stage relative to the first bird's eye view camera and the second bird's eye view camera.

14. The image inspection apparatus according to claim 1, wherein the second camera is provided at a peripheral portion of the first camera when viewed from a stage side.

15. The image inspection apparatus according to claim 1, further comprising, a ring illumination provided around an optical axis of the first camera and an optical axis of the second camera.

16. The image inspection apparatus according to claim 15, further comprising, a transmissive illumination provided below the stage and configured to irradiates the workpiece on the stage with illumination light from below.

17. The image inspection apparatus according to claim 1, wherein the first camera images the workpiece via a light-receiving lens which faces the stage, and a distance from the stage to the second camera is greater than a distance from the stage to the light-receiving lens of the first camera.

18. The image inspection apparatus according to claim 17, wherein the first camera includes an imaging element which receives light and generates the workpiece image, a distance from the stage to the imaging element in the first camera is greater than a distance from the stage to the second camera.

19. The image inspection apparatus according to claim 1, further comprising, a memory provided in image inspection apparatus and configured to store a calibration information for calibrating the coordinate systems of the first camera and the second camera.

20. The image inspection apparatus according to claim 15, wherein telecentricity of the second camera is lower than that of the first camera.

* * * * *